(12) United States Patent
Sim et al.

(10) Patent No.: US 11,350,093 B2
(45) Date of Patent: May 31, 2022

(54) RESIDUAL COEFFICIENT ENCODING/DECODING METHOD AND DEVICE

(71) Applicant: HANWHA TECHWIN CO., LTD., Seongnam (KR)

(72) Inventors: Dong Gyu Sim, Seoul (KR); Sea Nae Park, Seoul (KR); Jong Seok Lee, Seoul (KR)

(73) Assignee: HANWHA TECHWIN CO., LTD., Seongnam (KR)

( * ) Notice: Subject to any disclaimer, the term of this patent is extended or adjusted under 35 U.S.C. 154(b) by 0 days.

(21) Appl. No.: 16/972,444

(22) PCT Filed: Jun. 10, 2019

(86) PCT No.: PCT/KR2019/006962
§ 371 (c)(1),
(2) Date: Dec. 4, 2020

(87) PCT Pub. No.: WO2019/240450
PCT Pub. Date: Dec. 19, 2019

(65) Prior Publication Data
US 2021/0235086 A1    Jul. 29, 2021

(30) Foreign Application Priority Data

Jun. 11, 2018  (KR) .................. 10-2018-0066706
Jun. 19, 2018  (KR) .................. 10-2018-0070161

(51) Int. Cl.
*H04N 19/124*     (2014.01)
*H04N 19/13*      (2014.01)
*H04N 19/176*     (2014.01)

(52) U.S. Cl.
CPC .......... *H04N 19/124* (2014.11); *H04N 19/13* (2014.11); *H04N 19/176* (2014.11)

(58) Field of Classification Search
USPC .................................................. 375/240.03
See application file for complete search history.

(56) References Cited

U.S. PATENT DOCUMENTS 9,432,696 B2    8/2016  Chong et al.
9,866,829 B2 *  1/2018  Joshi .................. H03M 7/4006
(Continued)

FOREIGN PATENT DOCUMENTS

KR       20090097013 A      9/2009
KR     10-2014-0071429      6/2014
(Continued)

OTHER PUBLICATIONS

Kwangwoon University Industry-Academic Collaboration Foundation, International Search Report, dated Oct. 11, 2019, PCT/KR2019/006962, filed Jun. 10, 2019, 10 pgs.
(Continued)

*Primary Examiner* — Behrooz M Senfi
(74) *Attorney, Agent, or Firm* — Morgan, Lewis & Bockius LLP

(57) ABSTRACT

An encoding/decoding device according to the present invention derives the residual coefficient of a residual block, calculates a quantization parameter with respect to the residual block, performs inverse quantization for the residual coefficient by means of the quantization parameter, and can restore a residual sample of the residual block by performing inverse transformation for the inverse quantized residual coefficient.

7 Claims, 16 Drawing Sheets

(56) References Cited

U.S. PATENT DOCUMENTS

| | | | |
|---|---|---|---|
| 10,356,413 B1* | 7/2019 | Sim | H04N 19/186 |
| 10,477,205 B1* | 11/2019 | Sim | H04N 19/115 |
| 10,587,894 B2 | 3/2020 | Yoo et al. | |
| 10,764,584 B2* | 9/2020 | Sim | H04N 19/13 |
| 2013/0128966 A1 | 5/2013 | Gao et al. | |
| 2013/0188699 A1* | 7/2013 | Joshi | H04N 19/18 |
| | | | 375/240.12 |
| 2015/0264403 A1 | 9/2015 | Chong et al. | |
| 2015/0358621 A1 | 12/2015 | He et al. | |
| 2017/0150186 A1 | 5/2017 | Zhang et al. | |
| 2018/0184131 A1* | 6/2018 | Yoo | H04N 19/48 |
| 2018/0359491 A1 | 12/2018 | Kang et al. | |
| 2019/0045226 A1 | 2/2019 | Xu et al. | |
| 2019/0110061 A1 | 4/2019 | Park et al. | |
| 2019/0230356 A1 | 7/2019 | Chao et al. | |
| 2019/0289306 A1* | 9/2019 | Zhao | H04N 19/136 |
| 2020/0236362 A1* | 7/2020 | Lee | H04N 19/521 |
| 2020/0288134 A1* | 9/2020 | Lim | H04N 19/167 |
| 2020/0413040 A1* | 12/2020 | Lim | H04N 19/176 |

FOREIGN PATENT DOCUMENTS

| | | |
|---|---|---|
| KR | 10-2014-0074349 | 6/2014 |
| KR | 20160134702 A | 11/2016 |
| KR | 10-2016-0145561 | 12/2016 |
| KR | 10-2017-0023893 | 3/2017 |
| KR | 20170106592 A | 9/2017 |
| KR | 20170142870 A | 12/2017 |
| KR | 10-2018-0001485 | 1/2018 |
| KR | 10-2018-0007680 | 1/2018 |
| KR | 10-2018-0025285 | 3/2018 |
| WO | WO 2015/194913 | 12/2015 |
| WO | WO 2016/137166 | 9/2016 |

OTHER PUBLICATIONS

Bross, High Efficiency Video Coding (HEVC) Text Specification Draft 10 (for FDIS & Last Call), Joint Collaborative Team on Video Coding (JCT-VC), Document: JCTVC-L1003_v34, Jan. 14-13, 2013, 311 pgs.

KR Office Action dated Jul. 1, 2021—corresponding KR Application No. 10-2019-0121923 (Applicant: Kwangwoon University Industry-Academic Collaboration Foundation).

J. Chen, et al. Algorithm Description of Joint Exploration Test Model 7 (JEM 7). JVET of ITU-T and ISO/IEC. JVET-G1001 Ver. 1, Aug. 19, 2017, pp. 1-44.

Gary J. Sullivan, et al. Overview of the high efficiency video coding (HEVC) standard. IEEE Transactions on Circuits and Systems for Video Technology Dec. 2012. pp. 1649-1668.

Non-Final Office Action dated Jul. 12, 2021 —U.S. Appl. No. 16/937,468.

Chen et al., Algorithm description for Versatile Video Coding and Test Model 1 (VTM 1), Joint Video Experts Team (JVET) of ITU-T SG 16 WP 3 and ISO/IEC JTC 1/SC 29/WG 11, JVET-J1002-v2, Ver. 2, Jun. 16, 2018, 9 pgs.

Kwangwoon University Industry-Academy Collaboration Foundation, Notice of Office Action, KR10-20180070161, dated Dec. 13, 2018, 12 pgs.

X. Li, et al. Description of SDR video coding technology proposal by Tencent. JVET of ITU-T and ISO/IEC. JVET-J0029 Ver.2. Apr. 6, 2018, pp. 1-34.

Tzu-Der Chuang, et al. AhG Quantization: Sub-LCU Delta QP. JCTVC-E05L. Mar. 11, 2011.

Sim, Notice of Allowance, U.S. Appl. No. 16/184,581, dated Mar. 5, 2019, 8 pgs.

Sim, Non-Final Office Action, U.S. Appl. No. 16/431,562, dated Jan. 8, 2020, 10 pgs.

Sim, Notice of Allowance, U.S. Appl. No. 16/431,562, dated Apr. 29, 2020, 6 pgs.

Decision to grant registration, KR Application No. 1020180070161, dated Jul. 2, 2019 (Kwangwoon University Industry-Academic Collaboration Foundation).

Decision to grant, KR Application No. 1020180066706, dated Apr. 1, 2019, (Kwangwoon University Industry-Academic Collaboration Foundation).

Notification of reason for refusal, KR Application No. 1020180066706, dated Dec. 3, 2018, (Kwangwoon University Industry-Academic Collaboration Foundation).

Request for Preferential Examination, Report of Prior Art Search, KR Application No. 1020180070161, dated Aug. 8, 2018, (Kwangwoon University Industry-Academic Collaboration Foundation).

Request for Preferential Examination, Report of Prior Art Search, KR Application No. 1020180066706, dated Aug. 3, 2018, (Kwangwoon University Industry-Academic Collaboration Foundation).

* cited by examiner luma block chroma block

FIG. 12

RESIDUAL COEFFICIENT ENCODING/DECODING METHOD AND DEVICE

TECHNICAL FIELD

The present invention relates to a method and apparatus for encoding/decoding a video signal.

BACKGROUND ART

The demand for high resolution, high quality video is increasing in various applications. As the image data becomes high resolution and high quality, the data amount increases relative to the conventional image data. Therefore, when image data is transmitted using a medium such as a conventional wired/wireless broadband line or is stored using a conventional storage medium, the transmission cost and the storage cost are increased. High-efficiency image compression techniques may be utilized to solve these problems caused by the high resolution and high quality of image data.

DISCLOSURE

Technical Problem

An object of the present invention is to improve encoding/decoding efficiency of residual blocks.

An object of the present invention is to improve encoding/decoding efficiency through adaptive block division.

Technical Solution

A video encoding/decoding method and apparatus according to the present invention may derive a residual coefficient of a residual block, calculate a quantization parameter for the residual block, perform dequantization on the residual coefficient using the calculated quantization parameter for the residual block, and perform inverse transform on the dequantized residual coefficient to reconstruct a residual sample of the residual block.

The video encoding/decoding method and apparatus according to the present invention may scale the residual coefficient based on a quantization weight of a predetermined scaling list.

The scaling list according to the present invention may mean an arrangement of quantization weights defined for each frequency in the residual block.

The scaling list according to the present invention may be signaled in N×M form in the encoding apparatus.

In the video encoding/decoding method and apparatus according to the present invention, at least one of the inverse transform or the scaling may be performed separately in a horizontal direction and a vertical direction.

In the video encoding/decoding method and apparatus according to the present invention, the inverse transform may be performed in two-steps of a first inverse transform and a second inverse transform.

In the video encoding/decoding method and apparatus according to the present invention, the inverse transform may be performed in an order of the first inverse transform, and the scaling may be performed before the second inverse transform or between the second inverse transform and the first inverse transform.

In the video encoding/decoding method and apparatus according to the present invention, the residual blocks may be divided into one or more entropy groups.

In the video encoding/decoding method and apparatus according to the present invention, the entropy group may be defined as a group of residual coefficients belonging to the same/similar frequency band.

In the video encoding/decoding method and apparatus according to the present invention, at least one of a scan order, an entropy decoding scheme, or a binarization scheme relating to one of a plurality of entropy groups may be different from the other one of a plurality of entropy groups.

In the video encoding/decoding method and apparatus according to the present invention, the number of entropy groups may be variably determined based on encoding information relating to the residual block.

In the video encoding/decoding method and apparatus according to the present invention, the entropy group may be determined based on at least one of the number of the residual coefficients belonging to the entropy group or the scan order.

In the video encoding/decoding method and apparatus according to the present invention, the entropy group may be determined based on one, two or more pieces of position information.

In the video encoding/decoding method and apparatus according to the present invention, the position information may indicate a position of a specific residual coefficient belonging to the residual block.

In the video encoding/decoding method and apparatus according to the present invention, the residual coefficients are derived through scanning according to a predetermined scan order, and the scanning may be performed for each entropy group.

In the video encoding/decoding method and apparatus according to the present invention, the scanning may be performed using a different scan order for each entropy group.

In the video encoding/decoding method and apparatus according to the present invention, the scanning may be performed from a predetermined starting position within the residual block.

In the video encoding/decoding method and apparatus according to the present invention, the starting position may be determined based on at least one of information indicating a starting position of the scanning or information specifying an entropy group including a starting position of the scanning.

In the video encoding/decoding method and apparatus according to the present invention, the step of deriving the residual coefficient may further include setting a residual coefficient of a partial area in the residual block to a default value pre-defined in the decoding apparatus.

In the video encoding/decoding method and apparatus according to the present invention, the partial area may be an area excluding at least one of N columns from the left side or the M rows from the top side of the residual block, or may be an area excluding the N×M area in the residual block.

In the video encoding/decoding method and apparatus according to the present invention, N and M may be derived based on information encoded to specify the partial area.

In the video encoding/decoding method and apparatus according to the present invention, the residual block may be a block divided into a variable size/shape based on at least one of a quadtree, a binary tree or a triple tree.

Advantageous Effects

According to the present invention, encoding/decoding efficiency of a residual block may be improved based on a quantization weight of a predetermined scaling list.

According to the present invention, encoding/decoding efficiency of a residual block may be improved based on a predetermined entropy group.

According to the present invention, encoding/decoding efficiency of the residual block may be improved by setting the residual coefficient of a predetermined area in the residual block to a pre-defined default value.

Also, according to the present invention, encoding/decoding efficiency may be improved through block division of a tree structure.

DESCRIPTION OF DRAWINGS

FIGS. 12 and 13 illustrate a method of determining an entropy group of a residual block according to an embodiment of the present invention.

BEST MODE FOR CARRYING OUT THE INVENTION

Figure 1:
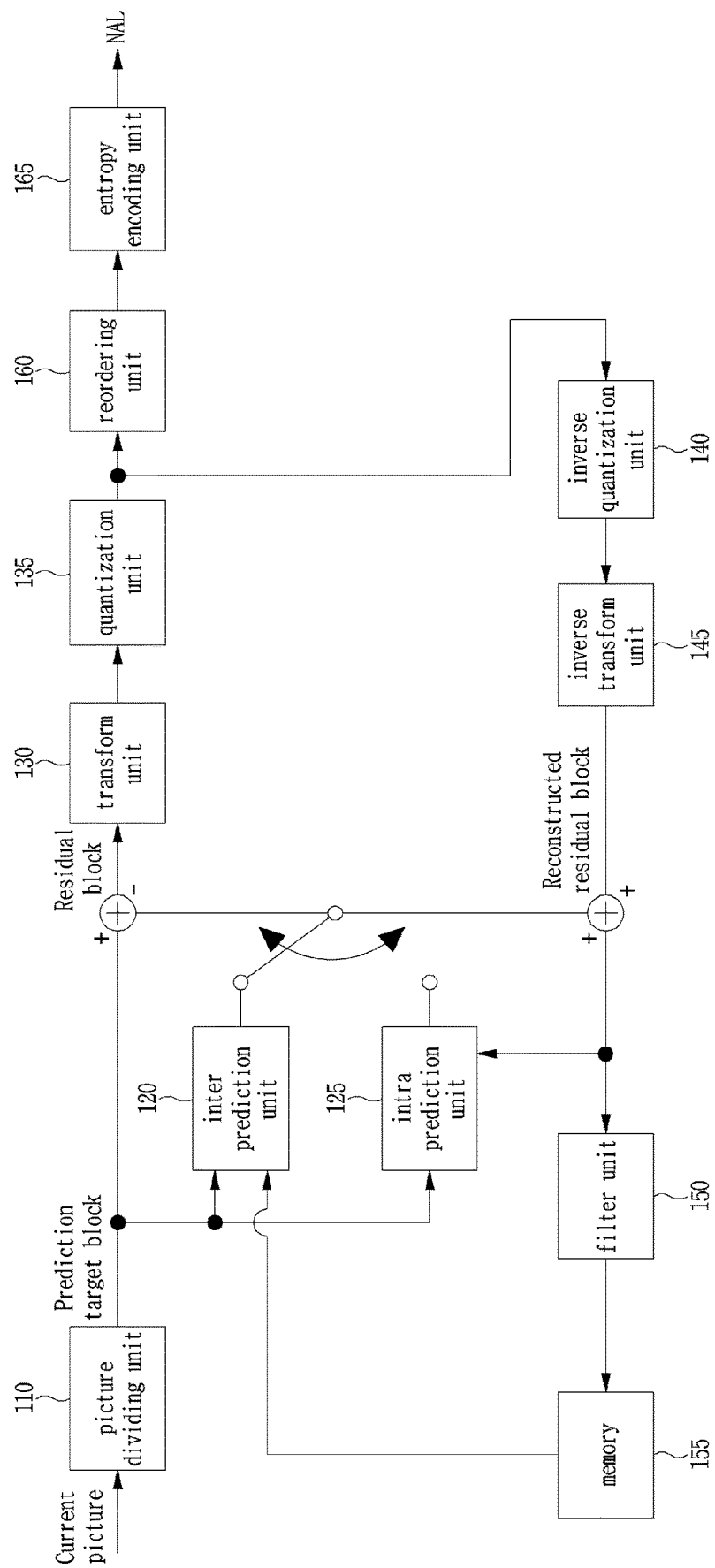
FIG. 1 is a block diagram illustrating an encoding apparatus according to an embodiment of the present invention.

A video encoding/decoding method and apparatus according to the present invention may derive a residual coefficient of a residual block, calculate a quantization parameter for the residual block, perform dequantization on the residual coefficient using the calculated quantization parameter for the residual block, and perform inverse transform on the dequantized residual coefficient to reconstruct a residual sample of the residual block.

The video encoding/decoding method and apparatus according to the present invention may scale the residual coefficient based on a quantization weight of a predetermined scaling list.

The scaling list according to the present invention may mean an arrangement of quantization weights defined for each frequency in the residual block.

The scaling list according to the present invention may be signaled in N×M form in the encoding apparatus.

In the video encoding/decoding method and apparatus according to the present invention, at least one of the inverse transform or the scaling may be performed separately in a horizontal direction and a vertical direction.

In the video encoding/decoding method and apparatus according to the present invention, the inverse transform may be performed in two-steps of a first inverse transform and a second inverse transform.

In the video encoding/decoding method and apparatus according to the present invention, the inverse transform may be performed in an order of the first inverse transform, and the scaling may be performed before the second inverse transform or between the second inverse transform and the first inverse transform.

In the video encoding/decoding method and apparatus according to the present invention, the residual blocks may be divided into one or more entropy groups.

In the video encoding/decoding method and apparatus according to the present invention, the entropy group may be defined as a group of residual coefficients belonging to the same/similar frequency band.

In the video encoding/decoding method and apparatus according to the present invention, at least one of a scan order, an entropy decoding scheme, or a binarization scheme relating to one of a plurality of entropy groups may be different from the other one of a plurality of entropy groups.

In the video encoding/decoding method and apparatus according to the present invention, the number of entropy groups may be variably determined based on encoding information relating to the residual block.

In the video encoding/decoding method and apparatus according to the present invention, the entropy group may be determined based on at least one of the number of the residual coefficients belonging to the entropy group or the scan order.

In the video encoding/decoding method and apparatus according to the present invention, the entropy group may be determined based on one, two or more pieces of position information.

In the video encoding/decoding method and apparatus according to the present invention, the position information may indicate a position of a specific residual coefficient belonging to the residual block.

In the video encoding/decoding method and apparatus according to the present invention, the residual coefficients are derived through scanning according to a predetermined scan order, and the scanning may be performed for each entropy group.

In the video encoding/decoding method and apparatus according to the present invention, the scanning may be performed using a different scan order for each entropy group.

In the video encoding/decoding method and apparatus according to the present invention, the scanning may be performed from a predetermined starting position within the residual block.

In the video encoding/decoding method and apparatus according to the present invention, the starting position may be determined based on at least one of information indicating a starting position of the scanning or information specifying an entropy group including a starting position of the scanning.

In the video encoding/decoding method and apparatus according to the present invention, the step of deriving the residual coefficient may further include setting a residual coefficient of a partial area in the residual block to a default value pre-defined in the decoding apparatus.

In the video encoding/decoding method and apparatus according to the present invention, the partial area may be an area excluding at least one of N columns from the left side or the M rows from the top side of the residual block, or may be an area excluding the N×M area in the residual block.

In the video encoding/decoding method and apparatus according to the present invention, N and M may be derived based on information encoded to specify the partial area.

In the video encoding/decoding method and apparatus according to the present invention, the residual block may be a block divided into a variable size/shape based on at least one of a quadtree, a binary tree or a triple tree.

Mode for Carrying Out the Invention

The present invention may be changed and modified variously and be illustrated with reference to different exemplary embodiments, some of which will be described and shown in the drawings. However, these embodiments are not intended for limiting the invention but are construed as including includes all modifications, equivalents and replacements which belong to the spirit and technical scope of the invention. Like reference numerals in the drawings refer to like elements throughout.

Although the terms first, second, etc. may be used to describe various elements, these elements should not be limited by these terms. These terms are used only to distinguish one element from another element. For example, a first element could be termed a second element and a second element could be termed a first element likewise without departing from the teachings of the present invention. The term "and/or" includes any and all combinations of a plurality of associated listed items.

It will be understood that when an element is referred to as being "connected to" or "coupled to" another element, the element can be directly connected or coupled to another element or intervening elements. On the contrary, when an element is referred to as being "directly connected to" or "directly coupled to" another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the invention will be described in detail with reference to the accompanying drawings. Like reference numerals in the drawings refer to like elements throughout, and redundant descriptions of like elements will be omitted herein.

FIG. 1 is a block diagram illustrating an encoding apparatus according to an embodiment of the present invention.

Referring to FIG. 1, the encoding apparatus 100 includes a picture dividing unit 110, prediction units 120 and 125, a transform unit 130, a quantization unit 135, a reordering unit 160, an entropy encoding unit 165, an inverse quantization unit 140, an inverse transform unit 145, a filter unit 150, and a memory 155.

Each of the elements shown in FIG. 1 is shown independently to represent different characteristic functions in the encoding apparatus, and may mean that each element is composed of separate hardware. But, the elements are independently arranged for convenience of description, wherein at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Some elements are not essential to the substantial functions in the invention and may be optional constituents for merely improving performance. The invention may be embodied by including only constituents essential to embodiment of the invention, except for constituents used to merely improve performance. The structure including only the essential constituents except for the optical constituents used to merely improve performance belongs to the scope of the invention.

The picture dividing unit 110 may divide an input picture into at least one block. In this case, a block may mean a coding unit (CU), a prediction unit (PU), or a transform unit (TU). The division may be performed based on at least one of a quadtree, a binary tree, or a triple tree. The quadtree is a method of dividing an upper block into sub-blocks whose width and height are half of an upper block. The binary tree is a method of dividing an upper block into sub-blocks whose either width or height is half of an upper block. In a binary tree, a block may have a non-square shape as well as a square shape by dividing an upper block based on the above-described binary tree-based division.

In the embodiments of the invention, a CU may be used to refer to not only a unit of encoding but also a unit of decoding.

The prediction units 120 and 125 may include an inter prediction unit 120 to perform inter prediction and an intra prediction unit 125 to perform intra prediction. The prediction units 120 and 125 may determine which of inter prediction and intra prediction is performed on a PU, and may determine specific information (for example, an intra prediction mode, a motion vector, and a reference picture) of the determined prediction method. Here, a processing unit on which prediction is performed may be different from a processing unit for which a prediction method and specific information thereon are determined. For example, a prediction method and a prediction mode may be determined for each PU, while prediction may be performed for each TU. A residual value (residual block) between a generated predicted block and an original block may be input to the transform unit 130. Further, prediction mode information, motion vector information and the like used for prediction may be encoded along with the residual value by the entropy encoding unit 165 and be transmitted to the decoding apparatus. When a specific encoding mode is used, the original block may be encoded and transmitted to the decoding apparatus without generating a prediction block by the prediction units 120 and 125.

The inter prediction unit 120 may predict a PU based on information on at least one picture among a previous picture of a current picture and a subsequent picture of a current picture. In some cases, the inter prediction unit 120 may predict a PU based on information of a partially encoded region in the current picture. The inter prediction unit 120 may include a reference picture interpolation unit, a motion prediction unit, and a motion compensation unit.

The reference picture interpolation unit may be supplied with reference picture information from the memory 155 and generate pixel information less than or equal to an integer pixel on a reference picture. In the case of luma pixels, a DCT-based 8-tap interpolation filter with a variable filter coefficient may be used to generate pixel information less than or equal to an integer pixel in a unit of a ¼ pixel. In the case of chroma pixels, a DCT-based 4-tap interpolation filter with a variable filter coefficient may be used to generate pixel information less than or equal to an integer pixel in a unit of a ⅛ pixel.

The motion prediction unit may perform motion prediction on the basis of the reference picture interpolated by the reference picture interpolation unit. Various methods, such as a full search-based block matching algorithm (FBMA), a three-step search (TSS) algorithm and a new three-step search (NTS) algorithm, may be used to calculate a motion vector. A motion vector has a motion vector value in the unit of a ½ or ¼ pixel on the basis of an interpolated pixel. The motion prediction unit may predict a current PU using different motion prediction methods. Various methods, such as skip mode, merge mode, and advanced motion vector prediction (AMVP) mode, etc. may be used as the motion prediction method.

The intra prediction unit 125 may generate a PU on the basis of information on a reference pixel neighboring to a current block. When a reference pixel is a pixel for which inter prediction has been performed because a block neighboring to the current PU is a block for which inter prediction has been performed, information on a reference pixel in the block for which inter prediction has been performed may be replaced with information on a reference pixel in a block for which intra prediction has been performed. That is, when a reference pixel is not available, information on the unavailable reference pixel may be replaced with information on at least one reference pixel of the available reference pixels.

A prediction mode of intra prediction includes a directional prediction mode in which reference pixel information is used according to a prediction direction and a non-directional prediction mode in which information on direction is not used in performing prediction. A mode for predicting a luma component and a mode for predicting a chroma component may be different from each other. Further, a chroma component may be predicted by using either intra prediction mode used to obtain a luma component or a predicted/reconstructed luma component.

In the intra prediction method, a predicted block may be generated by applying an adaptive intra smoothing (AIS) filter to the reference pixels according to the intra prediction mode. Different types of AIS filters may be applied to the reference pixels. In the intra prediction method, the intra prediction mode of a current PU may be predicted from an intra prediction mode of a PU neighboring to the current PU. In predicting the prediction mode of the current PU using mode information predicted from a neighboring PU, when the current PU and the neighboring PU have the same intra prediction mode, information indicating that the current PU and the neighboring PU have the same intra prediction mode may be transmitted using predetermined flag information. When the current PU and the neighboring PU have different intra prediction modes, information on the intra prediction mode of the current block may be encoded by entropy encoding.

A residual block including residual information may be generated. The residual information is a difference between an original block and a predicted block generated by the prediction units 120 and 125. The generated residual block may be input to the transform unit 130.

The transform unit 130 may transform the residual block including the residual data by using a transform type such as DCT, DST, or the like. In this case, the transform type may be determined based on the intra prediction mode of the prediction unit used to generate the residual block.

The quantization unit 135 may quantize values transformed into a frequency domain by the transform unit 130. A quantization coefficient may be changed depending on a block or importance of an image. Values output from the quantization unit 135 may be provided to the inverse quantization unit 140 and the rearrangement unit 160.

The rearrangement unit 160 may perform the rearrangement of the coefficient values on the quantized residual block.

The rearrangement unit 160 may change coefficients of a two-dimensional (2D) block into coefficients of a one-dimensional (1D) vector through coefficient scanning method. For example, the rearrangement unit 160 may scan a DC coefficient to a coefficient in the high-frequency region using a predetermined scan type, and change it into a one-dimensional vector form.

The entropy encoding unit 165 may perform entropy encoding on the basis of the values obtained by the rearrangement unit 160. Various encoding methods, such as exponential Golomb coding, context-adaptive variable length coding (CAVLC), or context-adaptive binary arithmetic coding (CABAC), may be used for entropy encoding.

The entropy encoding unit 165 may encode a variety of information, such as residual coefficient information and block type information on a CU, prediction mode information, partitioning unit information, PU information, transfer unit information, motion vector information, reference frame information, block interpolation information and filtering information from the rearrangement unit 160 and the prediction units 120 and 125.

The entropy encoding unit 165 may entropy-encode coefficients of a CU input from the rearrangement unit 160.

The inverse quantization unit 140 and the inverse transform unit 145 dequantize the values which are quantized by the quantization unit 135 and inverse-transform the values which are transformed by the transform unit 130. A reconstructed block may be generated by adding the residual values to the predicted PU. The residual values may be generated by the inverse quantization unit 140 and the inverse transform unit 145. The predicted PU may be predicted by the motion vector prediction unit, the motion compensation unit, and the intra prediction unit of the prediction units 120 and 125.

The filter unit 150 may include at least one of a deblocking filter, an offset unit, and an adaptive loop filter (ALF).

The deblocking filter may remove block distortion generated by boundaries between blocks in a reconstructed picture. Whether to apply the deblocking filter to a current block may be determined on the basis of pixels included in several rows or columns of the block. When the deblocking filter is applied to a block, a strong filter or a weak filter may be applied depending on a required deblocking filtering strength. When horizontal filtering and vertical filtering are performed in applying the deblocking filter, the horizontal filtering and vertical filtering may be performed in parallel.

The offset unit may apply the offset with respect to the original image to the deblocking filtered image, in units of pixels. A region to which the offset may be applied may be determined after partitioning pixels of a picture into a predetermined number of regions. The offset may be applied to the determined region in consideration of edge information on each pixel or the method of applying the offset to the determined region.

The ALF may perform filtering based on a comparison result of the filtered reconstructed image and the original image. Pixels included in an image may be partitioned into predetermined groups, a filter to be applied to each group may be determined, and differential filtering may be performed for each group. Information on whether to apply the ALF may be transferred by each coding unit (CU) and a shape and filter coefficients of an ALF to be applied to each block may vary. Further, an ALF with the same form (fixed form) may be applied to a block regardless of characteristics of the block.

The memory 155 may store a reconstructed block or picture output from the filter unit 150, and the stored reconstructed block or picture may be supplied to the prediction units 120 and 125 when performing inter prediction.

Figure 2:
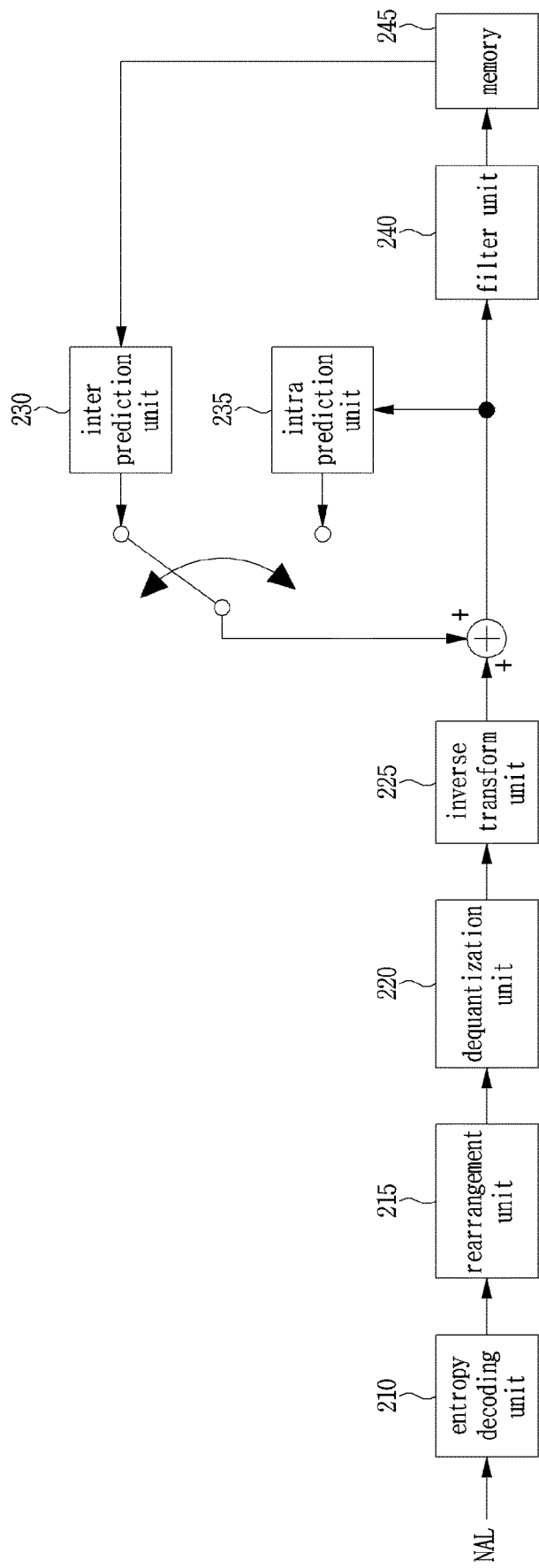
FIG. 2 is a block diagram illustrating a decoding apparatus according an exemplary embodiment of the present invention.

FIG. 2 is a block diagram illustrating a decoding apparatus according an exemplary embodiment of the present invention.

Referring to FIG. 2, the decoding apparatus 200 may include an entropy decoding unit 210, a rearrangement unit 215, a dequantization unit 220, an inverse transform unit 225, prediction units 230 and 235, a filter unit 240, and a memory 245.

Each of the elements shown in FIG. 2 is shown independently to represent different characteristic functions in the decoding apparatus, and may mean that each element is composed of separate hardware. But, the elements are independently arranged for convenience of description, wherein at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

The entropy decoding unit 210 may perform entropy decoding on the input bitstream. For example, various methods, such as exponential Golomb coding, CAVLC or CABAC, may be used for entropy encoding.

The entropy decoding unit 210 may decode information associated with intra prediction and inter prediction performed by the encoding apparatus.

The rearrangement unit 215 may perform rearrangement on the bitstream entropy-decoded by the entropy decoding unit 210. The rearrangement unit 215 may reconstruct and rearrange coefficients of a 1D vector into coefficients of a 2D block. The rearrangement unit 215 may be provided with information on coefficient scanning performed by the encoding apparatus and may perform rearrangement using a method of inversely scanning the coefficients, on the basis of scanning order performed by the encoding apparatus.

The dequantization unit 220 may perform dequantization on the basis of a quantization parameter and the rearranged coefficients of the block.

The inverse transform unit 225 may perform inverse-transform of the dequantized transform coefficients based on a predetermined transform type. In this case, the transform type may be determined based on at least one of a prediction mode (inter/intra prediction), a size/shape of a block, an intra prediction mode, a component type (luma/chroma component), or a partition type (QT, BT, TT, etc.)

The prediction units 230 and 235 may generate a prediction block on the basis of information for generating prediction block and information on a previously-decoded block or picture provided. The information for generating prediction block may be provided from the entropy decoding unit 210. The information on a previously-decoded block or picture may be provided from the memory 245.

The prediction units 230 and 235 may include a PU determination unit, an inter prediction unit and an intra prediction unit. The PU determination unit may receive a variety of information, such as PU information, intra prediction mode-related information of the intra prediction method and motion prediction-related information of an inter prediction method, etc. from the entropy decoding unit 210, may determine a PU for a current CU. The PU determination unit may determine which of the inter prediction and the intra prediction is performed on the PU. An inter prediction unit 230 may perform inter prediction on a current PU on the basis of information on at least one picture among a previous picture and a subsequent picture of a current picture including the current PU. An inter prediction unit 230 may use information necessary for inter prediction for the current PU provided from the encoding apparatus. The inter prediction may be performed on the basis of the information of the pre-reconstructed partial region in the current picture including the current PU. To this end, the pre-reconstructed partial region may be added to the reference picture list.

In order to perform inter prediction, it may be determined, in an unit of a CU, whether a motion prediction method for a PU included in the CU is a skip mode, a merge mode, an AMVP mode or a current picture reference mode.

An intra prediction unit 235 may generate a prediction block on the basis of pixel information in a current picture. When a PU is a PU for which intra prediction is performed, intra prediction may be performed based on intra prediction mode information on the PU provided from the encoding apparatus. The intra prediction unit 235 may include an AIS(Adaptive Intra Smoothing) filter, a reference pixel interpolation unit, and a DC filter. The AIS filter performs filtering on reference pixels of a current block. The AIS filter may decide whether to apply the filter or not, depending on a prediction mode for the current PU. AIS filtering may be performed on the reference pixels of the current block using the prediction mode for the PU and information on the AIS filter provided from the encoding apparatus. When the prediction mode for the current block is a mode not performing AIS filtering, the AIS filter may not be applied.

When the prediction mode for the PU indicates a prediction mode of performing intra prediction on the basis of pixel values obtained by interpolating the reference pixels, the reference pixel interpolation unit may generate reference pixels in a unit of a fractional pixel less than an integer pixel (i.e. full pixel) by interpolating the reference pixels. When the prediction mode for the current PU indicates a prediction mode of generating a prediction block without interpolating the reference pixels, the reference pixels may not be interpolated. The DC filter may generate a prediction block through filtering when the prediction mode for the current block is the DC mode.

The reconstructed block or picture may be provided to the filter unit 240. The filter unit 240 includes a deblocking filter, an offset unit, and an ALF.

The encoding apparatus may provide information on whether the deblocking filter is applied to a corresponding block or picture, and information on which of a strong filter and a weak filter is applied when the deblocking filter is used. The deblocking filter of the decoding apparatus may be provided with information on the deblocking filter from the encoding apparatus and may perform deblocking filtering on a corresponding block.

The offset unit may apply offset to the reconstructed picture on the basis of information on an offset type and offset value applied to the picture in the encoding process.

The ALF may be applied to a CU on the basis of information on whether the ALF is applied and ALF coefficient information, etc. provided from the encoding apparatus. The ALF information may be included and provided in a specific parameter set.

The memory 245 may store the reconstructed picture or block for use as a reference picture or a reference block and may provide the reconstructed picture to an output unit.

Figure 3:
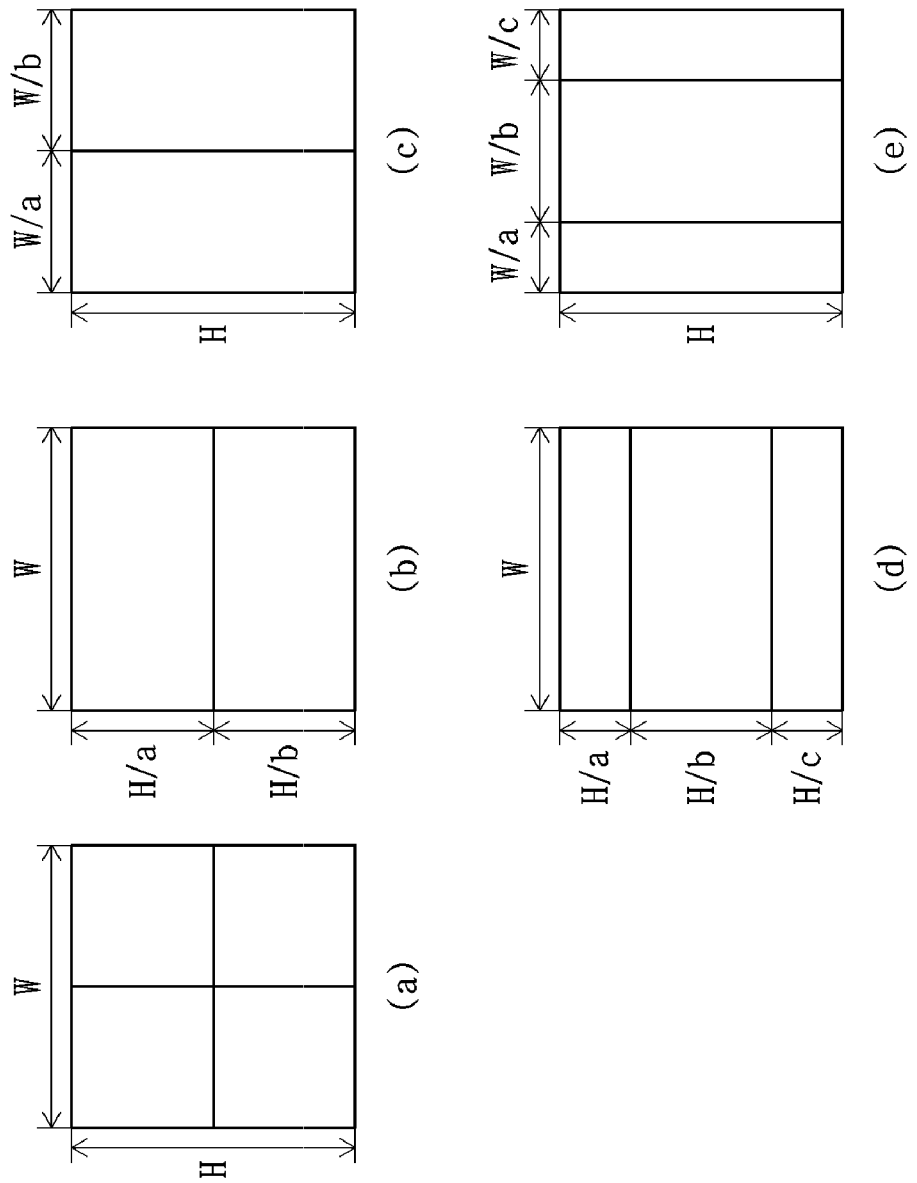
FIG. 3 illustrates a block division type according to an embodiment to which the present invention is applied.

FIG. 3 illustrates a block division type according to an embodiment to which the present invention is applied.

One block (hereinafter, referred to as a first block) may be divided into a plurality of sub-blocks (hereinafter, referred to as a second block) by at least one of a vertical line or a horizontal line. The number of each of the vertical and horizontal lines may be one, two, or more. Here, the first block may be a coding block (CU) which is a basic unit of image encoding/decoding, a prediction block (PU) which is a basic unit of prediction encoding/decoding or a transform block (TU) which is a basic unit of transform encoding/decoding. The first block may be a square block or a non-square block.

The division of the first block may be performed based on a quad tree, a binary tree, a triple tree, etc., and will be described in detail with reference to FIG. 3.

FIG. 3(a) illustrates a quad tree division (QT). QT is a division type in which the first block is divided into four second blocks. For example, when the first block of 2N×2N is divided by QT, the first block may be divided into four second blocks having N×N size. QT may be limited to apply to a square block only, but it is also applicable to a non-square block.

FIG. 3(b) illustrates a horizontal binary tree (hereinafter, referred to as Horizontal BT) division. Horizontal BT is a division type in which the first block is divided into two second blocks by one horizontal line. This division may be performed symmetrically or asymmetrically. For example, when the first block of 2N×2N is divided based on Horizontal BT, the first block may be divided into two second blocks with a height ratio of (a:b). Here, a and b may be the same value, and a may be larger or smaller than b.

FIG. 3(c) illustrates a vertical binary tree (hereinafter, referred to as Vertical BT) division. Vertical BT is a division type in which the first block is divided into two second blocks by one vertical line. This division may be performed symmetrically or asymmetrically. For example, when the first block of 2N×2N is divided based on Vertical BT, the first block may be divided into two second blocks with a width ratio of (a:b). Here, a and b may be the same value, and a may be larger or smaller than b.

FIG. 3(d) illustrates a horizontal triple tree (hereinafter, referred to as Horizontal TT) division. Horizontal TT is a division type in which the first block is divided into three second blocks by two horizontal lines. For example, when the first block of 2N×2N is divided based on Horizontal TT, the first block may be divided into three second blocks with a height ratio of (a:b:c). Here, a, b, and c may be the same value. Alternatively, a and c may be the same, and b may be greater or less than a.

FIG. 3(e) illustrates a vertical triple tree (hereinafter, referred to as Vertical TT) division. Vertical TT is a division type in which the first block is divided into three second blocks by two vertical lines. For example, when the first block of 2N×2N is divided based on Vertical TT, the first block may be divided into three second blocks with a width ratio of (a:b:c). Here, a, b, and c may be the same value or different values. Alternatively, a and c may be the same while b may be greater or less than a. Alternatively, a and b may be the same while c may be greater or less than a. Alternatively, b and c are the same while a may be larger or smaller than b.

The division described above may be performed based on the division information signaled from the encoding apparatus. The division information may include at least one of division type information, division direction information, or division ratio information.

The division type information may specify any one of the division types that are pre-defined in the encoding/decoding apparatus. The pre-defined division type may include at least one of QT, Horizontal BT, Vertical BT, Horizontal TT, Vertical TT, or non-division mode (No split). Alternatively, the division type information may mean information on whether QT, BT, or TT is applied, and may be encoded in the form of a flag or an index. In the case of BT or TT, the division direction information may indicate whether it is divided horizontally or vertically. In the case of BT or TT, the division ratio information may indicate the ratio of the width and/or the height of the second block.

Figure 4:
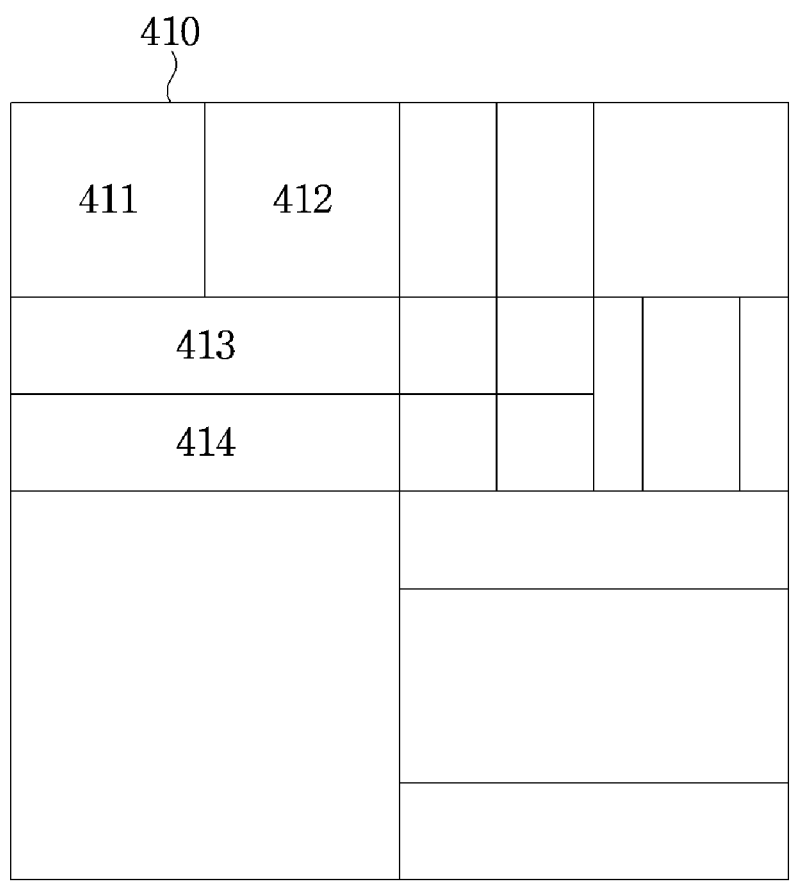
FIG. 4 illustrates a tree structure-based block division method according to an embodiment in which the present invention is applied.

FIG. 4 illustrates a tree structure-based block division method according to an embodiment in which the present invention is applied.

The block 400 illustrated in FIG. 4 is assumed to be a square block (hereinafter, referred to as a first block) having a size of 8N×8N and a division depth k. When the division information of the first block indicates QT division, the first block may be divided into four sub-blocks (hereinafter, referred to as a second block). The second block may have a size of 4N×4N and may have a division depth (k+1).

The four second blocks may be divided again based on either QT, BT, TT, or non-division mode. For example, when the division information of the second block indicates a horizontal binary tree (Horizontal BT), the second block is divided into two sub-blocks (hereinafter, referred to as a third block) as the second block 410 of FIG. 4. In this case, the third block may have a size of 4N×2N and may have a division depth (k+2).

The third block may also be divided again based on either QT, BT, TT, or non-division mode. For example, when the division information of the third block indicates a vertical binary tree (Vertical BT), the third block is divided into two sub-blocks 411 and 412 as illustrated in FIG. 4. In this case, the sub-blocks 411 and 412 may have a size of 2N×2N and a division depth (k+3). Alternatively, when the division information of the third block indicates a horizontal binary tree (Horizontal BT), the third block may be divided into two sub-blocks 413 and 414 as illustrated in FIG. 4. In this case, the sub-blocks 413 and 414 may have a size of 4N×N and a division depth (k+3).

The division may be performed independently or in parallel with the neighboring block, or may be performed sequentially according to a predetermined priority order.

The division information of the current block may be determined depending on at least one of the division information of the upper block of the current block or the division information of the neighboring block. For example, when the second block is divided based on Horizontal BT and the upper third block is divided based on Vertical BT, the lower third block does not need to be divided based on Vertical BT. If the lower third block is divided by Vertical BT, this is the same result as the second block is divided by QT. Therefore, encoding for the division information (particularly, the division direction information) of the lower third block may be skipped, and the decoding apparatus may be set so that the lower third block is divided in the horizontal direction.

The upper block may mean a block having a smaller division depth than the division depth of the current block. For example, when the division depth of the current block is (k+2), the division depth of the upper block may be (k+1). The neighboring block may be a block adjacent to the top or left side of the current block. The neighboring block may be a block having the same division depth as the current block.

The above-described division may be repeatedly performed up to the minimum unit of encoding/decoding. When divided into the minimum unit, the division information for the block is no longer signaled from the encoding apparatus. The information on the minimum unit may include at least one of a size or a shape of the minimum unit. The size of the minimum unit may be expressed by the width, the height, the minimum or maximum value of the width and height, the sum of the width and height, the number of pixels, or the division depth. The information on the minimum unit may be signaled in at least one of a video sequence, a picture, a slice, or a block unit. Alternatively, the information on the minimum unit may be a value pre-defined in the encoding/decoding apparatus. The information on the minimum unit may be signaled for each of CU, PU, and TU. Information on one minimum unit may be applied to CU, PU, and TU equally.

Figure 5:
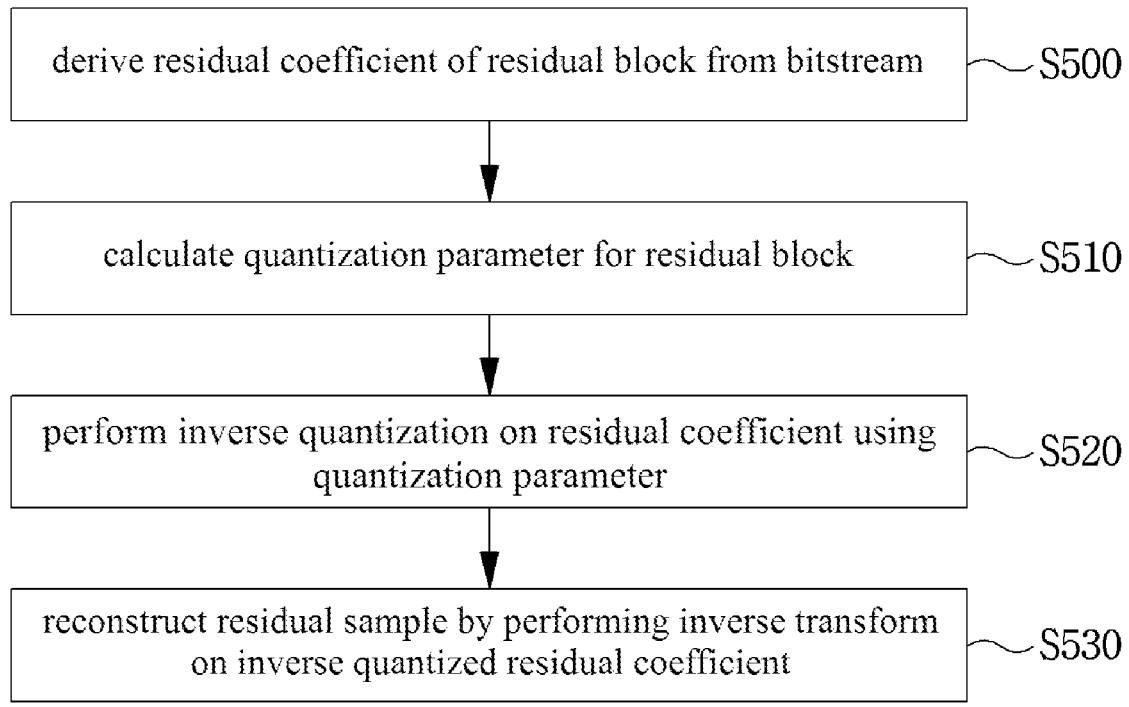
FIG. 5 illustrates a method of reconstructing a residual sample according to an embodiment of the present invention.

FIG. 5 illustrates a method of reconstructing a residual sample according to an embodiment of the present invention.

Referring to FIG. 5, the residual coefficient of the residual block may be derived by entropy decoding the bitstream (S500).

The encoding apparatus may perform the transform and/or quantization on the residual samples of the residual block to derive the residual coefficients, and may encode the derived residual coefficients based on a predetermined encoding scheme. The encoding scheme may include at least one of a scan order, an entropy encoding scheme, or a binarization scheme. Examples of the entropy encoding scheme may include exponential Golomb, CAVLC, CABAC, and the like. Examples of the binarization scheme may include truncated Rice (TR) binarization, k-th order Exp-Colomb (EGk) binarization, fixed-length (FL) binarization, and the like.

In this case, the residual block may be divided into one or more groups (hereinafter, referred to as entropy groups), and each entropy group may include at least one residual coefficient. The entropy group may mean a group of residual coefficients having the same/similar frequency band. The frequency band may be divided into a low frequency band and a high frequency band, or may be divided into three bands such as a low frequency band, an intermediate frequency band, and a high frequency band. However, this is merely an example, and the frequency band may be further subdivided considering the frequency property. The encoding of the residual coefficients may be performed for each entropy group in the residual block.

The decoding apparatus may derive a residual coefficient from the bitstream based on a predetermined decoding scheme. The decoding scheme is based on the above-described encoding scheme, and a detailed description thereof will be omitted.

The decoding of the residual block may be performed for each entropy group. For example, the entropy group to which the residual coefficient to be decoded belongs may be identified, and the residual coefficient may be derived based on the decoding scheme corresponding to the entropy group. At least one of the scan order, the entropy decoding scheme, or the binarization scheme relating to one of a plurality of entropy groups may be different from the other one of a plurality of entropy groups. The entropy group-based residual coefficient derivation method will be described with reference to FIGS. 12 to 15.

The derivation process of the residual coefficients may further include setting a residual coefficient of a partial area (e.g., a high-frequency area) in the residual block to a default value pre-defined in the decoding apparatus. This will be described with reference to FIG. 16.

The derivation of the residual coefficient may be performed by decoding at least one of information on the presence or absence of a non-zero residual coefficient, an absolute value (abs) or a sign of an encoded residual coefficient.

The derivation may further include a process of setting a residual coefficient of a high frequency region in the residual block to 0. The high frequency region may be defined as a region excluding at least one of n columns from a left of the residual block or m rows from a top of the residual block. The n and m may be values pre-committed in the encoding/decoding apparatus, or may be variably determined according to the size/type of the residual block. For example, when the residual block is 64×32, an area excluding 32 columns (here, n=32, m=0) from the left side of the residual block may be defined as a high frequency area. When the residual block is 32×64, an area excluding 32 rows (here, n=0, m=32) from the top of the residual block may be defined as a high frequency region. Alternatively, n and m may be derived based on information encoded to specify a high frequency region.

In addition, the process of setting the residual coefficient to 0 may be selectively performed in consideration of at least one of the size or shape of the residual block. For example, the above process may be applied only when the size of the residual block is greater than or equal to a predetermined threshold. The size of the residual block may be expressed as at least one of a width or a height of the residual block. The threshold value may mean a minimum size allowed to set the residual coefficient to 0. The threshold value may be a value pre-committed in an encoding/decoding of the residual block, or may be encoded and signaled by an encoding of the residual block. The threshold value may be 32, 64, 128, 256 or more.

The process of setting the residual coefficient to 0 may be selectively performed based on flag information. The flag information may indicate whether the residual coefficient of the high frequency area in the residual block is set to 0. The flag information may be derived from a decoding apparatus based on the size/type of the residual block, or may be encoded and signaled by an encoding apparatus. However, the above process may be limited to be performed only when the residual block is not encoded in the transform skip mode. Accordingly, when the residual block is encoded in the transform skip mode, the encoding apparatus may not encode information necessary to set the residual coefficient to 0.

Referring to FIG. 5, a quantization parameter for the residual block may be calculated (S510).

The quantization parameter may be derived using at least one of a quantization parameter prediction value (QPpred) or a quantization parameter difference value (deltaQP). In other words, the quantization parameter may be set to be the quantization parameter prediction value (QPpred) or may be derived by adding the quantization parameter difference value (deltaQP) to the quantization parameter prediction value (QPpred).

For example, when the dequantization is unnecessary for the block (e.g., merge mode, skip mode, no-transform mode, PCM mode, a case that there are no non-zero coefficients in the block (i.e., coded block flag=0), and the like), the quantization parameter difference value (deltaQP) may not be encoded. In this case, the quantization parameter prediction value (QPpred) may be set equal to a quantization parameter.

A method of deriving the quantization parameter prediction value (QPpred) will be described with reference to FIGS. 6 and 7. Meanwhile, the quantization parameter difference value (deltaQP) may be signaled in a predetermined unit, and a quantization parameter deriving method based on a signaling unit of the quantization parameter difference value (deltaQP) will be described with reference to FIG. 8.

The calculation of the quantization parameter may further include a process of modifying the derived quantization parameter based on the predetermined quantization parameter offset (QPoffset).

The quantization parameter offset (QPoffset) may be a fixed value which is pre-defined to the encoding/decoding apparatus, or may be encoded and signaled by the encoding apparatus. The quantization parameter offset (QPoffset) may be signaled in at least one level of a video sequence, picture, slice, tile or block unit. The unit in which the quantization parameter offset is signaled may be larger than the unit in which the quantization parameter difference value is signaled. The value and the number of the quantization parameter offset (QPoffset) may be adaptively determined according to a block size/shape, number of divisions, a prediction mode, an intra prediction mode, a component type (e.g., luma, chroma), and the like.

The number of quantization parameter offsets may be one, two, three, or more. For example, the quantization parameter offset may be defined in at least one of a picture level, a slice level, or a block level. The quantization parameter offset may be defined for each of the intra mode and the inter mode, or may be defined for each of the luma component and the chroma component. Alternatively, a separate offset for the LM mode of the intra prediction mode may be defined. Here, the LM mode may mean a mode in which a chroma block is predicted using prediction/reconstruction samples of a luma block.

Referring to FIG. 5, the dequantization may be performed on the residual coefficient using the calculated quantization parameter (S520).

Specifically, the dequantization may be performed based on at least one of the quantization parameter or a predetermined level scale value. The level scale value may be a value pre-defined to the encoding/decoding apparatus, or may be encoded and signaled by the encoding apparatus. The level scale value may be composed of k integer values of a one-dimensional array. For example, the level scale value may be defined as {40, 45, 51, 57, 64, 72}. However, this does not limit the number of level scale values and integer values. That is, the level scale value may be defined as another value, and the number of level scale values may be defined as 4, 5, 7, 8, or more.

Meanwhile, a predetermined quantization weight m may be further applied to the result of the dequantization, and this process is referred to as scaling. The scaling will be described with reference to FIGS. 10 and 11.

Further, when the residual block includes a plurality of entropy groups, different quantization parameters may be applied for each entropy group. For example, each entropy group in the residual block shares the same quantization parameter difference value, but different quantization parameter prediction values may be used. Conversely, each entropy group of the residual block shares the same quantization parameter prediction value, but different quantization parameter difference values may be used. That is, the unit for calculating the quantization parameter prediction value may be different from the unit for calculating the quantization parameter difference value. In this case, the dequantization may be performed for each entropy group. The dequantization process may be skipped for an entropy group having only a residual coefficient of zero.

Referring to FIG. 5, a residual sample may be reconstructed by performing an inverse transform on the dequantized residual coefficient (S530).

The inverse transform may be performed based on a predetermined transform type, and the transform type of the residual block may be determined based on the transform candidate set. The transform candidate set may include n transform types. For example, the transform candidate set may comprise at least one of DCT-II, DCT-V, DCT-VIII, DST-I or DST-VII.

In the encoding/decoding apparatus, m transform candidate sets may be defined. Here, m may be 1, 2, 3 or more. The number and/or sort of transform types belonging to one of the m transform candidate sets (hereinafter referred to as a first transform candidate set) may be different from the other one (hereinafter referred to as a second transform candidate set). For example, the first transform candidate set may be composed of p transform types, and the second transform candidate set may be composed of q transform types smaller than p. Alternatively, even when the first and second conversion candidate sets are composed of the same number of transform types, at least one transform type belonging to the first conversion candidate set may be different from the transform type belonging to the second conversion candidate set.

Any one of the m transform candidate sets may be selectively used.

The selection of the transform candidate set may be performed based on the size of the residual block. For example, if the size of the residual block is less than or equal to the threshold value, the first transform candidate set composed of p transform types is selected, and if not, the second transform candidate set composed of q transform types may be selected. The threshold value may be 32, 64, 128, 256 or more, and p may be a value greater than q.

Alternatively, the selection of the transform candidate set may be performed based on information to be signaled from the encoding apparatus. The information may specify any one of m transform candidate sets. The information may be signaled in at least one level of a picture, slice or block.

When the selected transform candidate set includes a plurality of transform types, the encoding apparatus may encode information specifying any one of the plurality of transform types. The decoding apparatus may determine the transform type of the residual block by decoding the encoded information.

Meanwhile, the inverse transform may be selectively performed based on a predetermined flag. Here, the flag may indicate whether the inverse transform is skipped for the residual block. For example, if the flag is 1, an inverse transform is not performed on the residual block, and if the flag is 0, the inverse transform may be performed on the residual block. Therefore, the transform type of the residual block may be derived only when the flag is 0. Alternatively, the inverse transform may be selectively performed based on the properties of the residual block. Based on the properties of the residual block, the decoding apparatus may determine whether or not the inverse transform is skipped. The properties may refer to the size/type of the residual block, the division type, the prediction mode, the component type, or other residual coefficient related encoding parameters.

Additional inverse transform (hereinafter referred to as a second inverse transform) in addition to the inverse transform (hereinafter referred to as a first inverse transform) may be performed, and this will be described with reference to FIG. 9.

Figure 6:
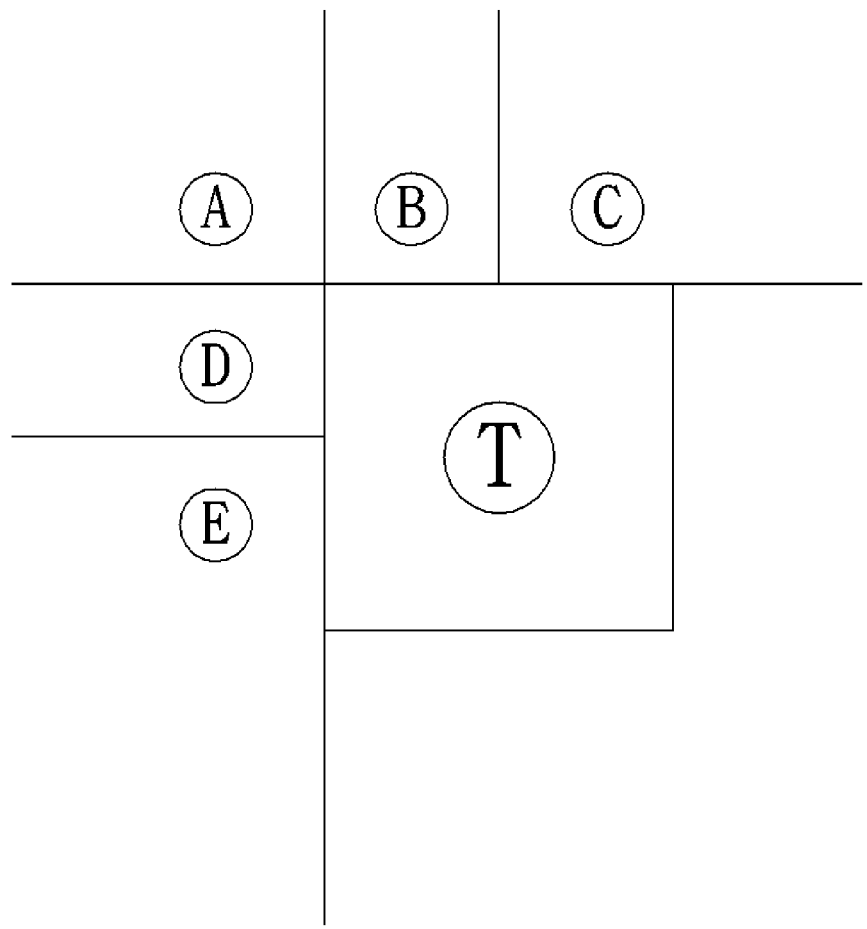
FIG. 6 illustrates a method of deriving a quantization parameter prediction value (QPpred) according to an embodiment of the present invention.

FIG. 6 illustrates a method of deriving a quantization parameter prediction value (QPpred) according to an embodiment of the present invention.

Referring to FIG. 6, a quantization parameter prediction value (QPpred) for a block T may be derived based on a quantization parameter of a neighboring block. The block T is a block of an N×M size, and may be square or non-square.

The neighboring block may be a block spatially/temporally adjacent to the block T, and may be a block previously decoded before the block T. For example, the neighboring block may include at least one of a left block, a top block, a left-top block, a right-top block, or a left-bottom block of the block T. Alternatively, the neighboring block may further include a collocated block which temporally corresponds to the block T. The collocated block may be defined as a block belonging to a picture different from the block T and including a position of at least one of a left-top corner sample, a bottom-right corner sample, or a center sample of the block T.

The position of the neighboring block may be a pre-defined position in the encoding/decoding apparatus. For example, the pre-defined position may be a left block and a top block, or may be a left block, a top block, and a top-left block. However, the present invention is not limited to this, and may further include a bottom-left block, a right-top block, and the like. The position of the neighboring block may be variably determined based on at least one property (e.g., size, shape, division depth, division type, component type, etc.) of at least one of the block T or the neighboring block. For example, the neighboring block may be determined to be the block having the largest area among the blocks adjacent to the block T, or may be determined to be the block which the length of the boundary adjacent to each other is the longest. This may be performed for the top block and the left block of the block T, respectively.

Alternatively, the information specifying the position of the neighboring block may be encoded and signaled by the encoding apparatus. The information may be encoded in the form of a flag, an index, or the like. For example, if the information is index 0, the quantization parameter prediction value (QPpred) of block T may be derived using the quantization parameter of the left block. If the information is index 1, the quantization parameter prediction value (QPpred) of the block T may be derived using the quantization parameter of the top block.

The number of the neighboring blocks is n, where n may be a natural number of 1, 2, 3, 4, or more. The number may be a fixed value pre-defined in the encoding/decoding apparatus. Alternatively, the number may be variably determined based on properties (e.g., size, type, division depth, division type, component type, etc.) of at least one of the block T or the neighboring block. Alternatively, the maximum number information for the neighboring blocks used to derive the quantization parameter prediction value (QPpred) of the block T may be encoded and signaled by the encoding apparatus. That is, the block T may use neighboring blocks within the number range according to the maximum number information. The maximum number information may be signaled at a level of at least one of a video sequence, a picture, and other fragment area (e.g., slice, tile, Coding Tree Block row, block).

As described above, the quantization parameter prediction value (QPpred) of block T may be derived using one or more neighboring blocks.

When a plurality of neighboring blocks are used, the quantization parameter prediction value (QPpred) of the block T may be derived through an operation process such as an intermediate value, an average value, a minimum value, a maximum value, or a mode value of quantization parameters of a plurality of neighboring blocks.

Alternatively, the quantization parameter predicted value (QPpred) of the block T may be derived by subtracting the QP of the top-left block from the sum of the QP of the top block and the QP of the left block. In this case, if there are a plurality of top block or left block, the QP of the top block or the left block may be determined through an operation process such as an intermediate value, an average value, a minimum value, a maximum value, or a mode value.

If there is an unavailable block among the neighboring blocks, the quantization parameter prediction value of the block T may be derived using only available neighboring blocks. Alternatively, when the neighboring block is unavailable, the quantization parameter of the neighboring block may be derived based on a quantization parameter defined in a predetermined fragment area. The fragment area may be a slice, a tile, a Coding Tree Block row, a block, or the like. The fragment area may denote an encoded/decoded area before the block T or an area to which the block T to be encoded/decoded belongs. The unavailability may be a case where the neighboring block does not exist physically, or a case where reference is not possible according to the rules of the encoding/decoding apparatus. For example, if block T and a neighboring block belong to different parallel processing areas (e.g., slices, tiles, etc.), block T may not be allowed to refer to the neighboring block.

Figure 7:
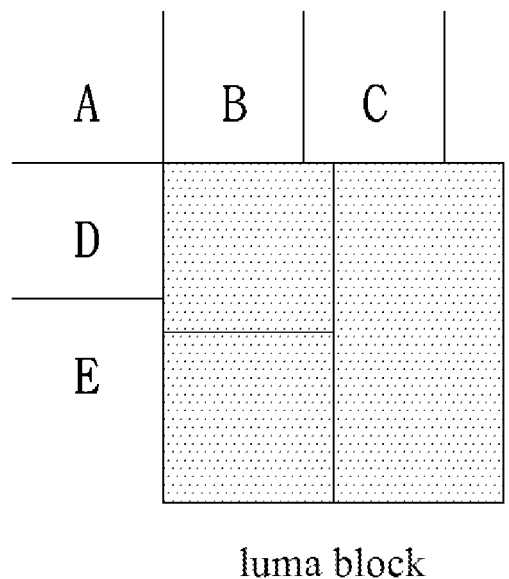
FIG. 7 illustrates a method of deriving a quantization parameter prediction value for a chroma component of a block T according to an embodiment of the present invention.
Figure 7:
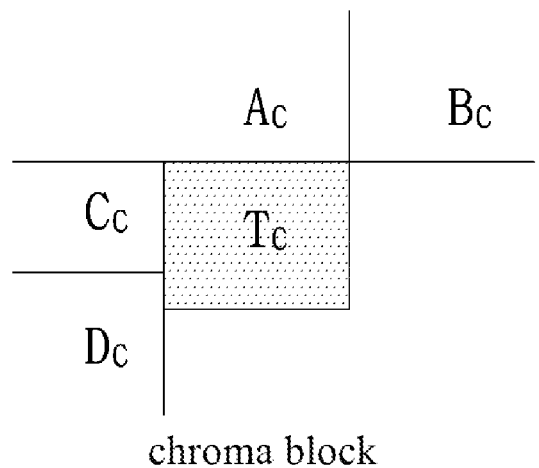

FIG. 7 illustrates a method of deriving a quantization parameter prediction value for a chroma component of a block T according to an embodiment of the present invention.

Hereinafter, the luma component and the chroma component of the block T will be referred to as a luma block and a chroma block, respectively.

In case of 4:2:0 color format, the chroma block TC may correspond to the luma block TY. The quantization parameter prediction value of the chroma block may be derived using the quantization parameter of the corresponding luma block.

However, as illustrated in FIG. 7, the division structure between the luma block and the chroma block may be different. In this case, a chroma block may correspond to a plurality of luma blocks. The quantization parameter prediction value of the chroma block may be derived using a quantization parameter of one of the plurality of luma blocks. In this case, a luma block corresponding to the position of the center sample or the position of the top-left sample of the chroma block may be used. A luma block having the largest area overlapping the chroma block may be used. Alternatively, the quantization parameter prediction value of the chroma block may be derived through calculation of an average value, a median value, a minimum value, a maximum value, a mode value, and the like of quantization parameters of a plurality of luma blocks.

The quantization parameter prediction value of the chroma block may be derived using the quantization parameter of the neighboring block, which has been described in detail with reference to FIG. 6, and a detailed description thereof will be omitted here.

As described above, the quantization parameter prediction value of the chroma block may be derived by using both the method using the quantization parameter of the corresponding luma block (first method) and the method using the quantization parameter of the neighboring block of the chroma block (second method). Alternatively, the quantization parameter prediction value of the chroma block may be derived by selecting either the first method or the second method.

The selection may be performed in consideration of whether or not the luma block and the chroma block have the same division structure, the prediction mode, the intra prediction mode, the color format, or the size/shape relating to the block T. For example, if the block T is encoded in the inter mode and the division structure of the chroma block is the same as the division structure of the luma block, the quantization parameter of the chroma block may be predicted using the first method. Alternatively, if the division structure of the chroma block is the same as the division structure of the luma block, the first method is used; otherwise, the second method may be used. Alternatively, if the intra prediction mode of the block T is the LM mode, the quantization parameter of the chroma block may be predicted using the first method.

Alternatively, the selection may be performed based on information specifying either the first method or the second method. The information may be encoded and signaled by an encoding apparatus. The information may be signaled in at least one level of a video sequence, picture, or other fragment area (e.g., slice, tile, Coding Tree Block row, and block).

The quantization parameter of the chroma block may be derived to be the same as the derived quantization parameter prediction value of the chroma block, or may be derived by adding a quantization parameter difference value to the quantization parameter prediction value. In addition, the derived quantization parameter may be modified using a predetermined quantization parameter offset, as illustrated in FIG. 5.

For example, in the case of a chroma block encoded in the LM mode, the quantization parameter prediction value may be set equal to a quantization parameter. In this case, the quantization parameter difference value may not be signaled, or the process of adding the signaled quantization parameter difference value may be omitted. Alternatively, in the case of a chroma block encoded in the LM mode, the quantization parameter may be modified using one, two or more quantization parameter offsets.

Figure 8:
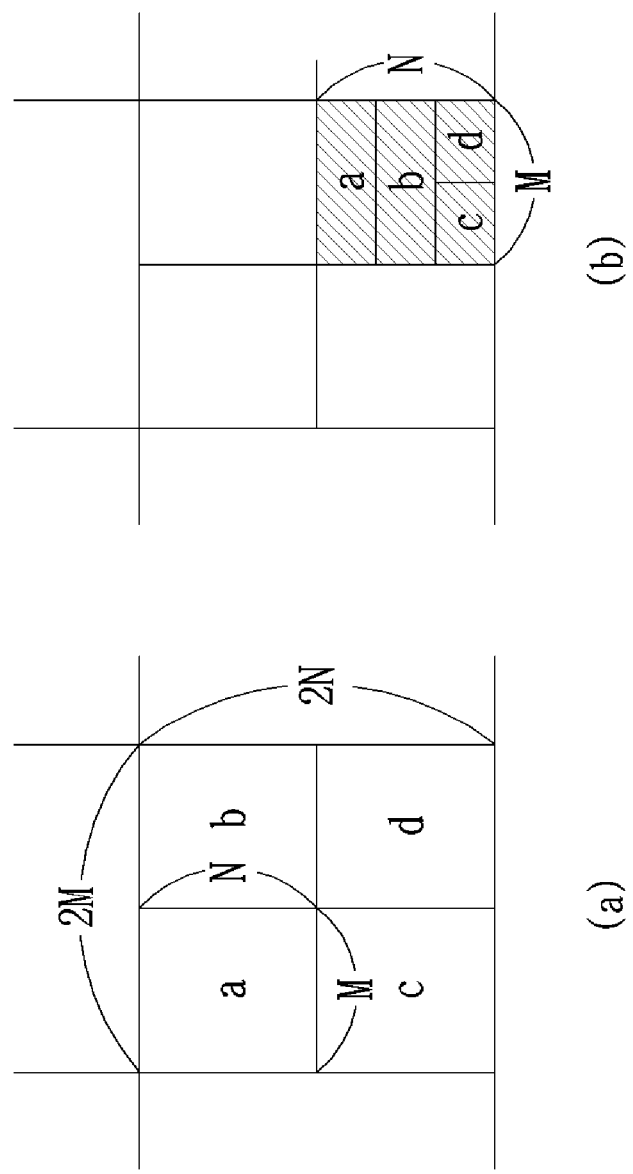
FIG. 8 illustrates a quantization parameter derivation method based on a signaling unit of a quantization parameter difference value (deltaQP) according to an embodiment of the present invention.

FIG. 8 illustrates a quantization parameter derivation method based on a signaling unit of a quantization parameter difference value (deltaQP) according to an embodiment of the present invention.

The encoding apparatus may determine a unit of a block for encoding deltaQP and encode information indicating the size of the block. Here, the size may be represented by at least one of a width or a height of a block, a product of a width and a height, a sum of a width and a height, and a minimum value/a maximum value of a width and a height. The decoding apparatus decodes the signaling information to obtain the minimum size of a block in which signaling of deltaQP is allowed. The information may be signaled at a level of at least one of a video sequence, a picture, a slice, or a tile. Alternatively, the minimum size may be derived as a minimum size of the transform block, or may be defined as a fixed size pre-defined in the encoding/decoding apparatus. For example, the minimum size may be defined as 4×4, 8×4, 4×8, 8×8, and the like. The information indicating the size of the block may be signaled for the luma component and the chroma component, respectively. Alternatively, the minimum size for the chroma block may be derived based on the minimum size for the luma block. For example, in 4:2:0 color format, the minimum size of the chroma block may be determined to be half of the minimum size of the luma block. In the inter mode, the division structure of the chroma block may be different from that of the luma block, and the minimum size of the chroma block may be determined to be half of the luma block.

Referring to FIG. 8, the quantization parameter of the current block may be derived based on the comparison result between the size of the current block and the minimum size. Here, the current block may be a block that is not further divided by the block division type such as QT, BT, TT, or etc.

FIG. 8($a$) illustrates a case where the size of the current block is 2M×2N and the minimum size is M×N. As illustrated in FIG. 8($a$), when the size of the current block is larger than the minimum size, the quantization parameter of the current block may be derived using QPpred and signaled deltaQP.

The QPpred may be derived based on at least one of the first method or the second method described above. The deltaQP may be signaled at block a and the remaining blocks b, c, d may share the deltaQP signaled from block a. In this case, the current block has one quantization parameter. Alternatively, the deltaQP may be signaled for each of blocks a-d with the minimum size. In this case, a quantization parameter may be derived for each of the blocks a-d belonging to the current block, and blocks a-d may have different quantization parameters.

Meanwhile, if the size of a current block is equal to the minimum size, it may be derived using the QPpred and the signaled deltaQP.

FIG. 8($b$) illustrates a case where the minimum size is M×N and the current block (a-d) is smaller than the minimum size. As illustrated in FIG. 8($b$), if the size of the current block is smaller than the minimum size, the quantization parameter of the current block may be derived using QPpred and signaled deltaQP.

The QPpred may be derived, based on the current block, using at least one of the first method or the second method described above. For example, QPpred may be derived for each of blocks a-d. Alternatively, QPpred may be derived for block a, and the remaining blocks b-d may share QPpred derived from block a. Alternatively, the QPpred may be derived, based on the upper block of the current block, using at least one of the first method or the second method described above. Here, the upper block may be a block including the current block and a block having a smaller depth than the current block. For example, when the division depth of the current block is k, the division depth of the upper block may be (k−1), (k−2), and so on. The upper block may be defined as a unit of a block sharing the QPpred. The upper block may be set to a size (M×N) equal to the minimum size. Alternatively, the encoding apparatus may determine a unit of a block sharing the QPpred, and may encode information specifying a unit of the block. The decoding apparatus may specify the position, size, shape and the like of the upper block based on the encoded information.

The deltaQP may be signaled in the upper block of the current block. Here, the upper block may be a block including a current block, and a block having a smaller depth than the current block. That is, when the division depth of the current block is k, the division depth of the upper block may be (k−1), (k−2), and so on. Here, it is assumed that the upper block is M×N illustrated in FIG. 8(b). Thus, a single and same quantization parameter may be derived for blocks a-d, and a different quantization parameter may be derived for each of blocks a-d. Alternatively, if the size of the current block is smaller than the minimum size as illustrated in FIG. 8(b), the quantization parameter of the current block may be derived using QPpred. In this case, decoding for deltaQP may be omitted. As described above, the QPpred may be derived, based on the current block or the upper block, using at least one of the first method and the second method, and a detailed description thereof will be omitted. Similarly, a single and same quantization parameter may be derived for the blocks a-d belonging to the M×N block, and a different quantization parameter may be derived for each of blocks a-d.

On the other hand, in the case of a block adjacent to the boundary of a picture, a slice, or a tile, the block may not satisfy the minimum size. In this case, the quantization parameter of the block may be derived using only QPpred, and decoding for deltaQP may be omitted.

Figure 9:
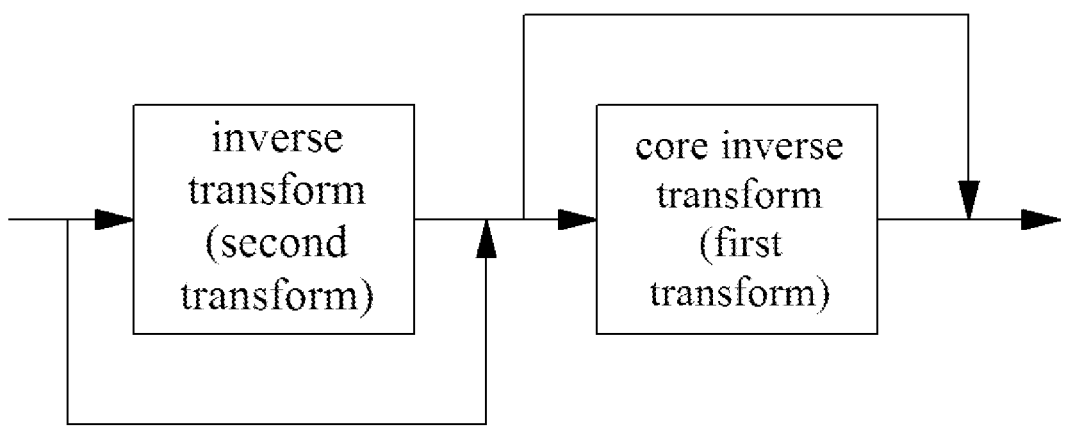
FIG. 9 illustrates an inverse transform process of a residual coefficient according to an embodiment of the present invention.

FIG. 9 illustrates an inverse transform process of a residual coefficient according to an embodiment of the present invention.

Referring to FIG. 9, a residual sample of a residual block may be reconstructed by performing at least one of a first inverse transform or a second inverse transform on the residual coefficient.

The second inverse transform may be applied to the entire area of the residual block or a partial area within the residual block. The partial area may mean a low frequency area in the residual block. The area to which the second inverse transform is applied may be variably determined in consideration of at least one of the size/shape of the residual block or the size/shape of the transform matrix of the second inverse transform.

For example, if either the width or the height of the residual block is equal to or greater than 8, a second inverse transform with an 8×8 transform matrix may be applied. When the size of the residual block is 8×8, the second inverse transform is applied to the entire area of the residual block, and when the size of the residual block is 16×16, the second inverse transform may be applied to only a partial area of the residual block. The partial area may be an 8×8 area located at the top-left of the residual block, a 16×8 area located at the top end of the residual block, an 8×16 area located at the left of the residual block, or the area excluding the 8×8 area located at the bottom-right of the residual block.

Alternatively, if either the width or height of the residual block is 4, a second inverse transform with a 4×4 transform matrix may be applied. When the size of the residual block is 4×8 or 8×4, the second inverse transform may be applied only to a partial area of the residual block (e.g., a 4×4 area located at the top-left of the residual block), and the second inverse transform may be applied to each of two 4×4 areas belonging to the residual block.

The size of the transform matrix of the second inverse transform may be 4×4, 8×8, 16×16, 32×32 or more. The shape of the transform matrix is not limited to a square, but may be implemented as a non-square. However, in order to reduce the complexity of the transform, the size of the transform matrix allowed for the second inverse transform may be limited to N×M or less. N and M may be 4, 8, or 16, respectively, and N and M may be the same or different from each other.

In the second inverse transform process, the transform type of the residual block may be determined through the transform type derivation method described in FIG. 5. Alternatively, the transform type in the second inverse transform may be pre-defined in the encoding/decoding apparatus. For example, as the transform type in the second inverse transform, one of the above-mentioned five transform types may be fixedly used.

The second inverse transform may be selectively performed based on a flag indicating whether the first inverse transform is skipped (hereinafter referred to as a first flag) in the residual block. That is, when the first inverse transform is skipped in the residual block according to the first flag, the performance of the second inverse transform may be skipped.

Alternatively, a flag indicating whether the second inverse transform is skipped (hereinafter referred to as a second flag) may be signaled separately. If the second flag is 1, a second inverse transform is not performed, and if the flag is 0, a second inverse transform may be performed. The first flag and the second flag may be independently encoded and signaled. Alternatively, either one of the first flag and the second flag may be signaled depending on the other. For example, only when either one of the first flag and the second flag is 1, the other may be signaled. Conversely, only when either one of the first flag and the second flag is 0, the other may be signaled.

The second inverse transform may not be applied when the number of non-zero residual coefficients belonging to the residual block is smaller than n. Where n may be a value pre-defined to the encoding/decoding apparatus. For example, n may be a natural number of 1, 2, 3 or 8 or less. Alternatively, n may be variably determined based on the size of the residual block.

Meanwhile, FIG. 9 illustrates performing the second inverse transform before the first inverse transform, but it does not limit the order of performing the inverse transform. That is, the second inverse transform may be performed before the first inverse transform, or may be performed after the first inverse transform. When the second inverse transform is performed before the first inverse transform, the scaling described in FIG. 5 may be performed between the dequantization and the second inverse transform, or may be performed between the first inverse transform and the second inverse transform. Conversely, when the second inverse transform is performed after the first inverse transform, the scaling described in FIG. 5 may be performed between the dequantization and the first inverse transform, or may be performed between the first inverse transform and the second inverse transform.

Figure 10:
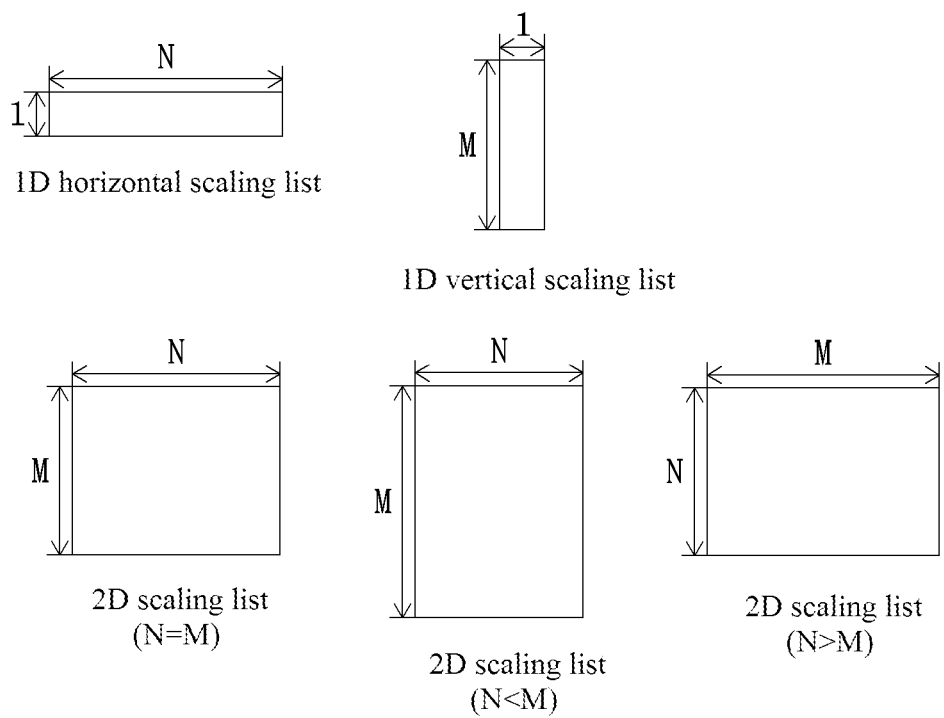
FIG. 10 illustrates a shape of a scaling list related to a scaling process according to an embodiment of the present invention.

FIG. 10 illustrates a shape of a scaling list related to a scaling process according to an embodiment of the present invention.

As mentioned in FIG. 5, the scaling may refer to a process of applying a predetermined quantization weight (m) to a residual coefficient of a residual block. The residual coefficient of the residual block may be square or N×M non-square. The quantization weight may be defined for each frequency in the residual block, and an array of quantization weights defined for each frequency will be referred to as a scaling list.

The quantization weight of the scaling list may be signaled at the encoding apparatus (Method A).

With respect to Method A, the quantization weight may be signaled for each of the positions or frequency components of the residual coefficients in the residual block. The quantization weight may be signaled in at least one level of a video sequence, a picture, or other fragment area (e.g., slice, tile, Coding Tree Block row, and block).

As illustrated in FIG. 10, a scaling list having various sizes/shapes determined by the combination of N and M may be signaled. Here, N and M may be integers greater than or equal to 1. The scaling list may be signaled in a two-dimensional form of N×M, or may be signaled by arranging a two-dimensional array of N×M in one dimension. Alternatively, the scaling list may be signaled by dividing into a horizontal scaling list of N×1 and a vertical scaling list of 1×M.

The shape of the scaling list may differ depending on whether the scaling is performed before the second inverse transform according to FIG. 9. For example, when the scaling is performed before the second inverse transform, it is signaled in one-dimensional form, otherwise it may be signaled in two-dimensional form.

The quantization weight of the scaling list may be a value pre-set in the encoding/decoding apparatus (Method B). With respect to Method B, the quantization weight may be one and the same value regardless of the position of the residual coefficients in the residual block. Alternatively, the quantization weight may be derived based on the table information that is pre-defined in the encoding/decoding apparatus. The table information may define a quantization weight according to at least one of a position of a residual coefficient, a block size, a component type, and a prediction mode.

The quantization weight of the scaling list may be determined by referring to all or part of a previously used or signaled scaling list (Method C). The scaling list to be referred to may be the most recently used or signaled in the encoding/decoding order, or may be used or signaled in a previous fragment area (e.g., a slice, a tile, a Coding Tree Block (CTB) row, a CTB, other sub-block). To this end, information indicating whether to refer to a previous scaling list may be encoded and signaled. Information specifying the quantization weight reused in the previous scaling list may be encoded and signaled.

The quantization weight may be determined by selectively using one of Methods A to C described above. The selection may be performed based on at least one of the size/type of the residual block, the division type, the prediction mode, the component type, the transform type, or predetermined flag information. The flag information may include a flag related to whether or not a quantization weight is applied, a flag related to whether or not to perform a transform skip, and the like.

In Methods A to C described above, the quantization weight of the scaling list may be determined for each of the luma block and the chroma block. For example, if the color format is 4:2:0 or 4:2:2, a scaling list for each of the luma block and the chroma block may be signaled. Alternatively, the scaling list of the chroma block may be determined by sampling the scaling list of the luma block at a predetermined ratio. The ratio may be determined based on a color format which is a ratio between a luma component and a chroma component. Alternatively, in the above-described Methods A to C, the scaling list may be determined differently depending on the transform type of the residual block. The transform type of the residual block may be determined for the vertical transform and the horizontal transform, respectively. The scaling list may be determined differently depending on the determined transform type of the vertical/horizontal transform. The transform type of the residual block may be determined in at least one of the first inverse transform or the second inverse transform according to FIG. 9.

Figure 11:
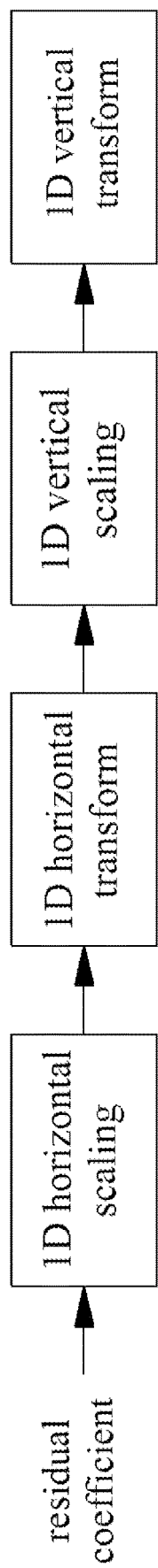
FIG. 11 illustrates a quantization weight-based scaling and inverse transform process according to an embodiment of the present invention.

FIG. 11 illustrates a quantization weight-based scaling and inverse transform process according to an embodiment of the present invention.

At least one of a quantization weight-based scaling or inverse transform may be performed by dividing into the horizontal direction and the vertical direction.

As mentioned in FIG. 10, the scaling list may be signaled by dividing into a horizontal scaling list of N×1 and a vertical scaling list of 1×M. In this case, the decoding apparatus may perform each of a horizontal scaling based on the horizontal scaling list (hereinafter, referred to as 1D horizontal scaling) and a vertical scaling based on the vertical scaling list (hereinafter referred to as 1D vertical scaling). And, the inverse transform may be performed on the residual coefficients to which the scaling is applied. In this case, the horizontal transform (hereinafter, referred to as 1D horizontal transform) may be performed on the residual coefficients to which the 1D horizontal scaling is applied. And, the vertical transform (hereinafter, referred to as 1D vertical transform) may be performed on the residual coefficients to which the 1D vertical scaling is applied. Alternatively, horizontal and vertical transforms (hereinafter referred to as 2D inverse transform) may be performed on the residual coefficients to which the scaling is applied.

For example, as illustrated in FIG. 11, the scaling and inverse transform for the residual coefficients may include performing 1D horizontal (vertical) transform after 1D horizontal (vertical) scaling (hereinafter referred to as a first step) and performing 1D vertical (horizontal) transform after 1D vertical (horizontal) scaling (hereinafter referred to as a second step). The scaling and inverse transform may be sequentially performed in the order of the first step to the second step, and the first step and the second step may be performed in parallel.

Alternatively, the horizontal/vertical transform may be performed after the horizontal/vertical scaling with respect to the residual coefficients. That is, scaling and inverse transform of the residual coefficients may be performed in the order of 1D horizontal (vertical) scaling→1D vertical (horizontal) scaling→1D horizontal (vertical) transform→1D vertical (horizontal) transform. The 1D horizontal (vertical) scaling and 1D vertical (horizontal) scaling may be performed sequentially or in parallel. Likewise, 1D horizontal (vertical) transform and 1D vertical (horizontal) transform may be performed sequentially or in parallel.

On the other hand, the scaling list may be signaled in a two-dimensional form of N×M. In this case, the scaling list-based scaling (hereinafter, referred to as 2D scaling) may be performed and the inverse transform may be performed on the scaled residual coefficients. Alternatively, the scaling list may be signaled in the form of a one-dimensional array of N×M two-dimensional arrays, or may be signaled by dividing into a horizontal scaling list of N×1 and a vertical scaling list of 1×M. In this case, the decoding apparatus may rearrange the signaled scaling list into two dimensions of N×M. The decoding apparatus may perform inverse transform after 2D scaling on the residual coefficients. Here, the inverse transform may be performed by dividing into 1D horizontal transform and 1D vertical transform, or may be 2D inverse transform.

When the scaling is performed before the second inverse transform according to FIG. 9, the inverse transform in this embodiment may mean the second inverse transform. On the other hand, when the scaling is performed between the first inverse transform and the second inverse transform according to FIG. 9, the inverse transform in this embodiment may mean the first inverse transform.

Figure 12:
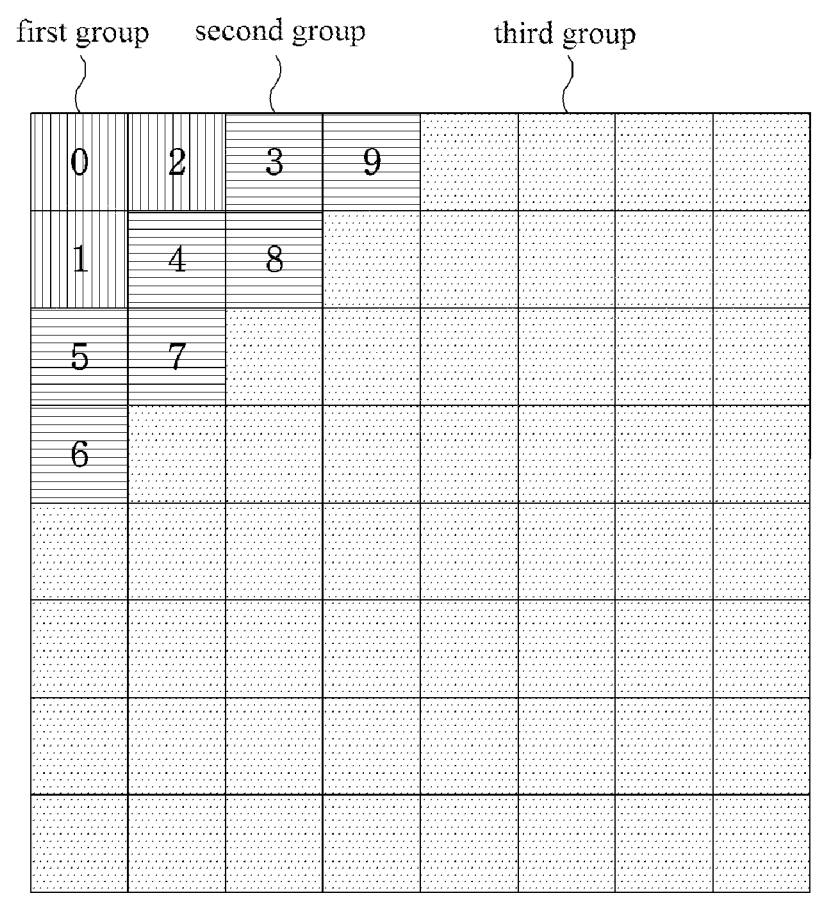
Figure 13:
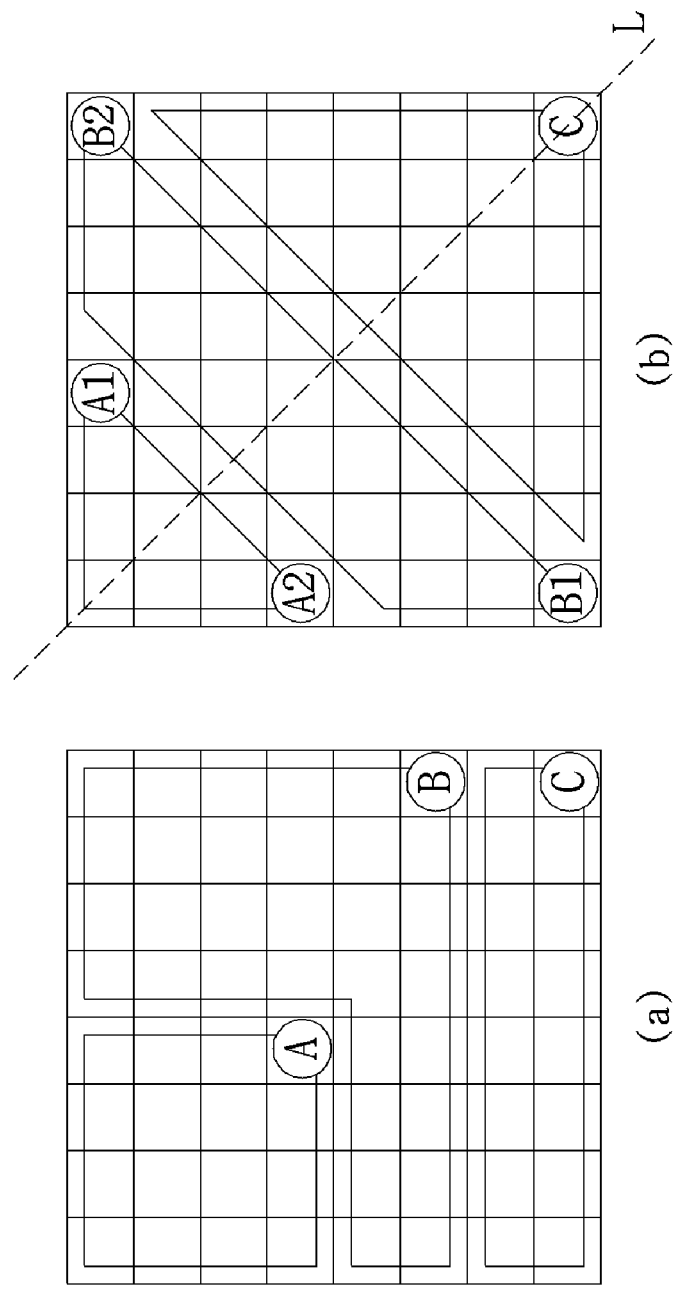

FIGS. 12 and 13 illustrate a method of determining an entropy group of a residual block according to an embodiment of the present invention.

The number of entropy groups belonging to the residual block may be n. For example, the residual block may be divided into two entropy groups: a first group which is a low frequency region and a second group which is a high frequency region. Alternatively, the residual block may be divided into three entropy groups: a first group which is a low frequency region, a second group which is a middle frequency region, and a third group which is a high frequency region. However, this is merely an example, and n may be 1, or may be an integer greater than or equal to 4.

The value n may be a value pre-defined in the encoding/decoding apparatus, or may be derived based on information signaled from the encoding apparatus. The information may include information indicating whether the residual block is divided into a plurality of entropy groups, information indicating the number of entropy groups belonging to the residual block, and etc. The information may be signaled in at least one level of a video sequence, picture, or other fragment area (e.g., slice, tile, Coding Tree Block row, coding block, transform block).

Alternatively, the value n may be variably determined based on the encoding information about the residual block. The encoding information may include not only information encoded and signaled by the encoding apparatus but also information derived in the decoding apparatus based on the signaled information.

For example, the encoding information may include at least one of a block size/shape, a block availability, a division type, number of divisions, a component type, a prediction mode, information on an intra prediction mode, an inter mode, motion information, a transform type, a transform skip mode, information about non-zero residual coefficients, scan order, color format, in-loop filter information, and etc.

The block size may be expressed by one of a width and a height, a minimum value/maximum value of a width and a height, a sum of a width and a height, the number of samples belonging to a block, and the like. The availability of the block may be determined in consideration of the block position, the range of the parallel processing area, the decoding order, and the like. The prediction mode may mean information indicating an intra mode or an inter mode. The information on the intra prediction mode includes information relating to whether the intra prediction mode is the non-directional mode, whether the intra prediction mode is the vertical/horizontal mode, the directionality of the intra prediction mode, the number of intra prediction modes pre-defined in the encoding/decoding apparatus, and the like. The inter mode may mean information indicating a merge/skip mode, an AMVP mode, or a current picture reference mode. The current picture reference mode refers to a method of predicting a current block using the pre-reconstructed area of the current picture. The current picture may be a picture to which the current block belongs. The current picture may be added to a reference picture list for inter prediction, and the current picture may be arranged, in a reference picture list, after a short-term reference picture or a long-term reference picture. The motion information may include a prediction direction flag, a motion vector, a reference picture index, and etc. The encoding information may be related to at least one of a current block, a neighboring block of a current block, or an upper block of a current block. The upper block may mean a block having a smaller division depth than the current block.

Referring to FIG. 12, the entropy group may be determined based on at least one of the number of residual coefficients belonging to the entropy group (hereinafter referred to as coefficient number information) or the scanning order. The coefficient number information may be defined for each entropy group.

For example, it is assumed that coefficient number information of the first group and the second group indicates 3 and 7, respectively, and that the scanning order is a zigzag scan. In this case, as illustrated in FIG. 12, according to the zigzag scan, the first group is determined as a group of three residual coefficients (that is, a group of residual coefficients at positions 0 to 2) and the second group is determined as a group of seven residual coefficients (that is, a group of residual coefficients at positions 3 to 9), and the third group may be determined as a group of residual coefficients excluding the first group and the second group in the residual block.

As described above, the first group is defined as a group from the top-left residual coefficient of the residual block to the residual coefficient $C_1$ at the position shifted by the coefficient number information of the first group. Similarly, the second group is defined as a group from the residual coefficient $C_1$ to the residual coefficient $C_2$ at a position shifted by the coefficient number information of the second group. The third group is defined as a set of residual coefficients excluding the first group and the second group in the residual block. The shifting is in accordance with the (inverse) scan order of the residual block or each group.

The coefficient number information may be a value pre-defined in the encoding/decoding apparatus (first embodiment). Alternatively, the coefficient number information may be signaled in at least one level of a video sequence, picture, and other fragment area (e.g., a slice, a tile, a coding tree block row, a coding block, a transform block) (second embodiment). Alternatively, the coefficient number information may be variably determined based on the encoding information about the residual block (third embodiment). Here, the encoding information is the same as the above-described encoding information, and a detailed description thereof will be omitted. The coefficient number information may be derived based on coefficient number information of a predetermined reference block (fourth embodiment). Here, the reference block may be a neighboring block or an upper block of the residual block. The neighboring block refers to a pre-decoded block before the residual block, and may be at least one of blocks adjacent to a left/right or a top/bottom of the residual block. The upper block may be a block having a smaller division depth than the residual block.

On the other hand, the coefficient number information of some groups among a plurality of entropy groups may be determined based on one of the first to fourth embodiments described above, and the coefficient number information of some other groups may be determined based on the other one of the first to fourth embodiments described above.

One entropy group may be determined based on one, two or more pieces of position information. The position information may indicate the position of a specific residual coefficient belonging to the residual block, and may be information for specifying the size, shape, position, etc. of the entropy group.

Referring to FIG. 13(a), the entropy group may be distinguished based on the position information of one residual coefficient. In this case, when the number of entropy groups belonging to the residual block is n, the number of position information may be (n−1).

For example, when the position information of the first group specifies the position $(X_A, Y_A)$ of the residual coefficient A, the first group may be determined as a group of residual coefficients at the position $(x_1, y_1)$ (where, $0 \leq x_1 \leq X_A$, $0 \leq y_1 \leq Y_A$). When the position information of the second group specifies the position $(X_B, Y_B)$ of the residual coefficient B, the second group may be determined as a group excluding the first group in residual coefficients at position $(x_2, y_2)$ (where, $0 \leq x_2 \leq X_B$, $0 \leq y_2 \leq Y_B$). The third group may be determined as a group of residual coefficients excluding the first group and the second group in the residual block.

Referring to FIG. 13(b), the entropy group may be distinguished based on a plurality of pieces of position information.

For example, when the position information of the first group specifies the positions of the residual coefficients A1 and A2, the first group may be determined as a group of residual coefficients located on the left side of the line passing through A1 and A2. That is, the first group may be composed of 10 residual coefficients. When the position information of the second group specifies the position of the residual coefficients B1 and B2, the second group may be determined as a group excluding the first group in a group of residual coefficients located on the left side of the line passing through B1 and B2. That is, the second group may be composed of 26 residual coefficients. The third group may be determined as a group of residual coefficients excluding the first group and the second group in the residual block.

The first group may be determined using two pieces of position information specifying positions of A1 and A2, respectively and the second group may be determined using two pieces of position information specifying positions of B1 and B2, respectively have. However, as illustrated in FIG. 13(b), the entropy group may be implemented in a symmetrical form, based on the diagonal line L of the residual block. In this case, any one of the two pieces of position information may be derived based on the other. For example, the position information of A2 may be derived based on the position information of A1. Similarly, the position information of B2 may be derived based on the position information of B1.

Further, some of the plurality of entropy groups may be determined based on one piece of position information, and the rest may be determined based on two or more pieces of position information. For example, the first group is determined based on one piece of position information as in the embodiment of FIG. 13(a), and the second group is determined based on two piece of position information as in the embodiment of FIG. 13(b). Conversely, the first group is determined based on two pieces of position information as in the embodiment of FIG. 13(b), and the second group is determined based on one piece of position information as in the embodiment of FIG. 13(a).

The position information may be a value pre-defined in the encoding/decoding apparatus (first embodiment). Alternatively, the position information may be signaled in at least one level of a video sequence, picture, other fragment area (e.g., slice, tile, Coding Tree Block row, coding block, transform block) (second embodiment). In this case, the block level may be a unit with a fixed size such as 4×4, 8×8, or 16×16. However, this does not limit the shape of the block level, and the block level may be a non-square unit with a fixed size. Alternatively, the position information may be variably determined based on the encoding information about the residual block (third embodiment). Here, the encoding information is the same as the above-described encoding information, and a detailed description thereof will be omitted. Alternatively, the position information may be derived based on position information in a predetermined reference block (fourth embodiment). Here, the reference block is the same as the above-described reference block, and a detailed description will be omitted.

On the other hand, the position information of some groups of the plurality of entropy groups may be determined based on one of the first to fourth embodiments, and the position information of the other groups may be determined based on the other one of the first to fourth embodiments.

Figure 14:
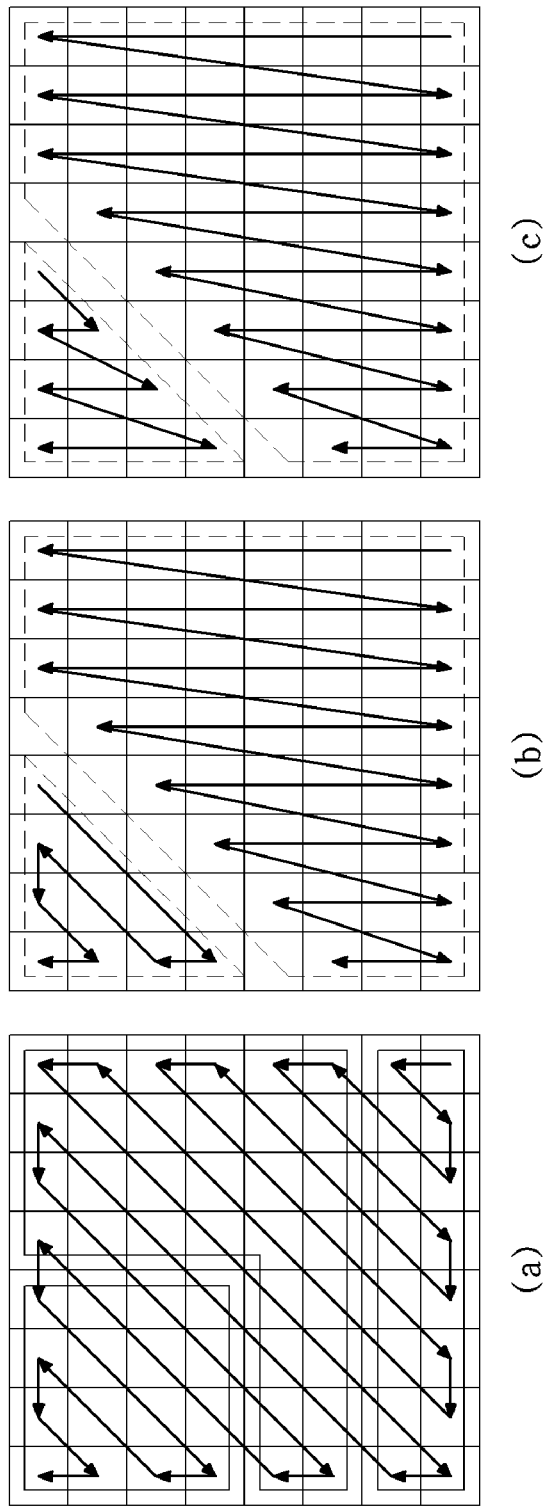
FIG. 14 illustrates the relationship between scanning of residual coefficients and a entropy group according to an embodiment of the present invention.

FIG. 14 illustrates the relationship between scanning of residual coefficients and a entropy group according to an embodiment of the present invention.

The decoding apparatus may derive the residual coefficient of the residual block through scanning according to a predetermined scan order. The scan order includes zigzag scan, z scan, up-right diagonal scan, bottom-left diagonal scan, horizontal scan, and vertical scan. Here, the up-right diagonal scan may mean a diagonal scan from the top-right end to the bottom-left end of the residual block, and the bottom-left diagonal scan may mean a diagonal scan from the bottom-left end to the top-right end of the residual block.

When the residual block includes a plurality of entropy groups, the scan may be performed regardless of the entropy group, or may be performed for each entropy group. The residual block may use only one scan order for the scanning, or may use a different scan order for each entropy group.

Specifically, referring to FIG. 14(a), the residual block may include three entropy groups. The three entropy groups belonging to the residual block may use one and the same scan order, i.e., a zigzag scan. However, the scanning based on the zigzag scan is not performed in a unit of an entropy group, but may be performed in a unit of a residual block. Therefore, at least one of the residual coefficients of the first entropy group located at the top-left of the residual block may be scanned earlier than at least one of the residual coefficients of the second entropy group.

On the other hand, referring to FIG. 14(b), the residual block may include two entropy groups. Scanning for residual coefficients may be performed in a unit of an entropy group, respectively. In this case, the scan order of the first entropy group may be different from the scan order of the second entropy group. For example, the scan order of the first entropy group may be a zigzag scan, and the scan order of the second entropy group may be a vertical scan. Scanning for residual coefficients may be performed from the bottom-right to the top-left of the residual block. The scanning for the first entropy group may be performed after the scanning is completed for all the residual coefficients of the second entropy group.

Referring to FIG. 14(c), the residual block may include two entropy groups. Scanning for residual coefficients may be performed in a unit of a entropy group, respectively. In this case, the scan order of the first entropy group may be the same as the scan order of the second entropy group. For example, the scan order of both the first and second entropy groups may be a vertical scan. Scanning for residual coefficients may be performed from the bottom-right to the top-left of the residual block. The scanning for the first entropy group may be performed after the scanning is completed for all the residual coefficients of the second entropy group.

Hereinafter, a method for determining the scan order of the residual blocks will be described. As described above, in a unit of a residual block, one or more scan orders may be used. In this case, at least one of zigzag scan, z scan, up-right diagonal scan, bottom-left diagonal scan, horizontal scan, and vertical scan may be selectively used.

The scan order may be set to be a default mode predefined in the encoding/decoding apparatus (first embodiment). For example, the pre-defined default mode may be a zig-zag scan or a z-scan. The scan order may be derived based on information signaled from the encoding apparatus (second embodiment). The information may mean information specifying the scan order of the residual block. The information may be signaled in at least one level of a video sequence, picture, and other fragment area (e.g., slice, tile, Coding Tree Block row, coding block, transform block). The information may be signaled for each entropy group, or may be signaled in a unit of a residual block.

Alternatively, the scan order may be determined based on the encoding information about the residual block (third embodiment). The encoding information may include not only information encoded and signaled by the encoding apparatus but also information derived in the decoding apparatus, based on the signaled information. For example, the encoding information may include at least one of a block size/type, a block availability, a division type, number of divisions, a component type, a prediction mode, information on an intra prediction mode, an inter mode, motion information, a transform type, a transform skip mode, information about non-zero residual coefficients, color format, size/shape of entropy group, and the like. This is as described with reference to FIG. 12, and a detailed description will be omitted.

Alternatively, the scan order may be derived based on a scan order of a predetermined reference block (fourth embodiment). Here, the reference block may be a neighboring block or an upper block of the residual block. The neighboring block refers to a pre-decoded block before the residual block, and may be at least one of blocks adjacent to a left/right or a top/bottom end of the residual block. The upper block may be a block having a smaller division depth than the residual block.

On the other hand, when one residual block uses a plurality of scan orders, one part of the plurality of scan orders is determined based on one of the first to fourth embodiments described above, and the other part is determined based on the other one of the first to fourth embodiments.

Figure 15:
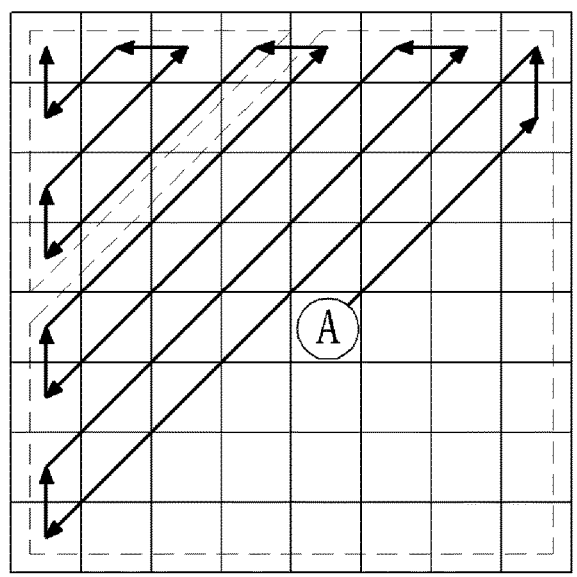
FIG. 15 illustrates a method of scanning a residual coefficient according to an embodiment of the present invention.
Figure 15:
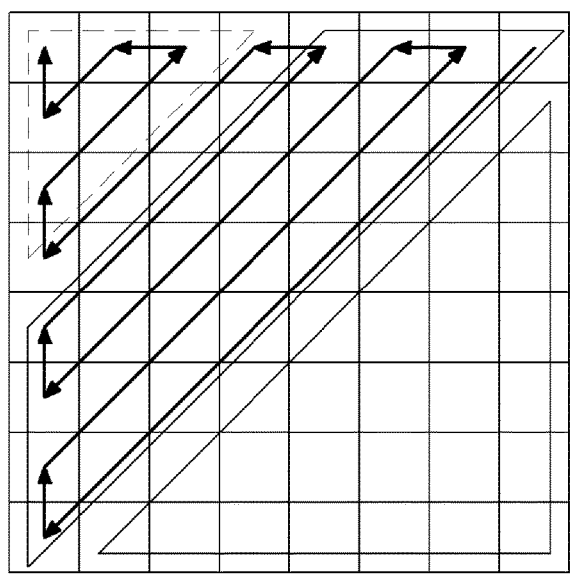

FIG. 15 illustrates a method of scanning a residual coefficient according to an embodiment of the present invention.

Scanning may be performed from the starting position of scanning in the residual block. The starting position may indicate the position of the specific residual coefficient of the residual block. The specific residual coefficient may mean a residual coefficient having a non-zero integer value (hereinafter referred to as a non-zero value). The specific residual coefficient may be located at the end of the non-zero values belonging to the residual block in the inverse scan order. Conversely, the specific residual coefficient may be located at the beginning of the non-zero values belonging to the residual block in the scan order.

For example, the scanning may be performed based on information indicating a starting position of scanning (hereinafter referred to as first information). The first information may be encoded and signaled by an encoding apparatus. Scanning may be performed from a position specified by the first information. As illustrated in FIG. 15(a), the starting position of the scanning may be specified as the A position instead of the bottom-right position of the residual block, based on the first information. In this case, the residual coefficient existing between the A position and the bottom-right position of the residual block in the scan order may be set equal to zero. The residual coefficient at the bottom-right position of the residual block may also be set equal to zero.

Alternatively, the scanning may be performed based on information specifying an entropy group including a starting position of scanning (hereinafter referred to as second information). The second information may be encoded and signaled by an encoding apparatus. Based on the second information, an entropy group including a starting position of scanning is specified, and scanning may be performed from the specified entropy group. In this case, the scan order between the entropy groups depends on the scan order for the residual coefficients. According to the second information, scanning may be skipped for some entropy group of the residual block. The residual coefficient of the entropy group in which the scanning is skipped may be set equal to zero.

Referring to FIG. 15(b), the residual block is composed of a first entropy group including a top-left residual coefficient, a second entropy group located at the center, and a third entropy group including a bottom-left residual coefficient. Based on the second information, the second entropy group may be determined as an entropy group including the starting position of scanning. In this case, scanning is performed from the second entropy group, and the residual coefficient of the third entropy group may be set equal to zero.

Alternatively, the starting position of scanning may be determined through a combination of the first information and the second information. That is, one of a plurality of entropy groups may be specified based on the second information, and a starting position in the specified entropy group may be specified based on the first information. Further, FIG. 15 does not limit the number, size or shape of entropy groups, and the number of the entropy groups may be four or more, and the shape of the entropy group may have a square or a non-square.

Figure 16:
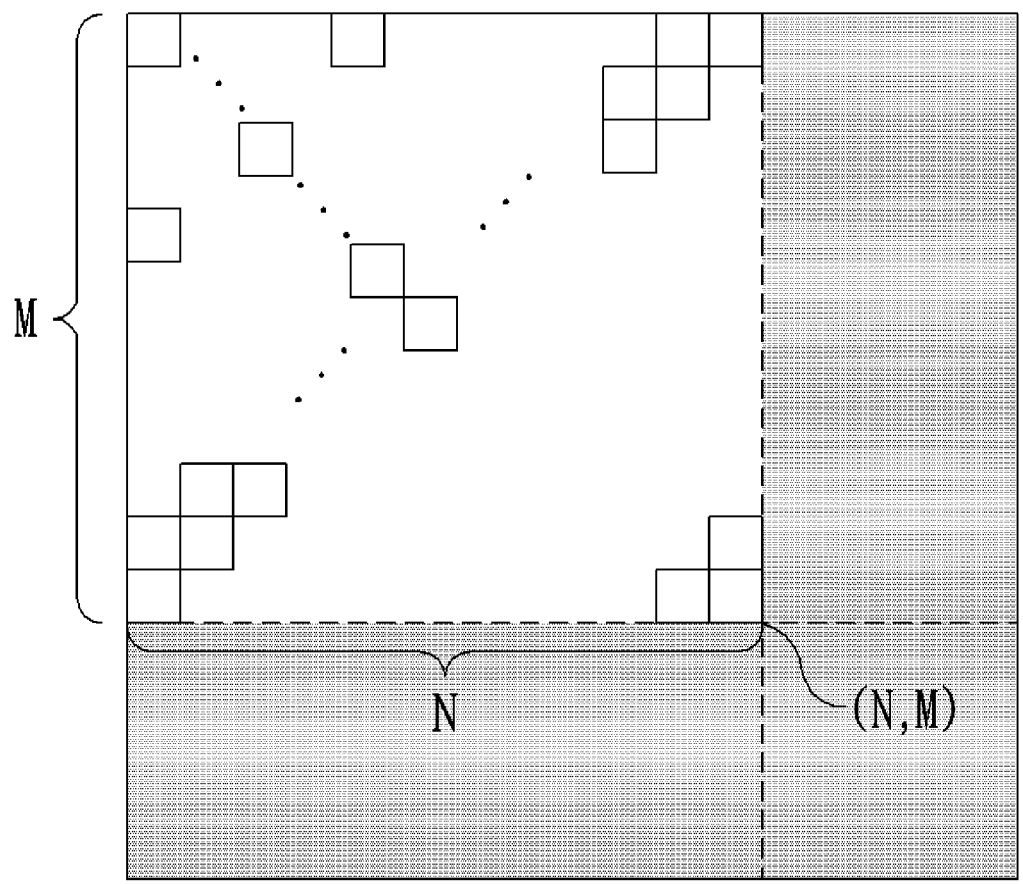
FIG. 16 illustrates a method of processing residual coefficients of a partial area in a residual block according to an embodiment of the present invention.

FIG. 16 illustrates a method of processing residual coefficients of a partial area in a residual block according to an embodiment of the present invention.

The encoding apparatus may perform a transform and/or quantization on the residual samples of the residual block to derive residual coefficients. In this case, the residual coefficient of the partial area in the residual block may not be entropy-encoded, and only the residual coefficient of the remaining area may be entropy-encoded and transmitted to the decoding apparatus.

The decoding apparatus may decode only the residual coefficient transmitted from the encoding apparatus and set the residual coefficient of the partial region as a pre-defined default value in the decoding apparatus. The default value may include at least one of an absolute value (abs) of a residual coefficient or a sign. The absolute value may be zero, or may be a value greater than or equal to two or three.

Hereinafter, a method for determining the partial area in the decoding apparatus will be described.

Referring to FIG. 16, the partial area (gray area) may be an area excluding at least one of N columns from the left side or M rows from the top side in the residual block. Alternatively, the partial area may be an area excluding the N×M area in the residual block.

The N and M may be a value pre-defined in the encoding/decoding apparatus or may be variably determined according to the size/type of the residual block. For example, when the residual block is 64×32, an area excluding the 32 columns (where N=32, M=0) from the left side of the residual block may be defined as a partial area. When the residual block is 32×64, an area excluding 32 rows (where N=0, M=32) from the top side of the residual block may be defined as a partial area. However, the values of N and M are only examples. N may be an integer greater than or equal to half the width (W) of the residual block, and M may be an integer greater than or equal to half the height (H) of the residual block.

Alternatively, the N and M may be derived based on information encoded to specify a partial area. For example, the residual block may be divided into a predetermined sub-area (e.g., a triangle, a rectangle, a square, or any other shape). The index or coordinate information of the sub-area corresponding to the partial area may be encoded and signaled. Alternatively, the index of the sub-area corresponding to the N×M area may be encoded and signaled, or the coordinate information specifying the size/shape of the N×M area may be encoded and signaled.

Specifically, the residual block may be divided into k sub-areas, based on at least one of a vertical line or a horizontal line. The value k may be an integer of 2, 3, 4 or more. The value k may be a fixed value pre-defined in the encoding/decoding apparatus, or may be variably determined based on the vertical/horizontal line. An index may be assigned to each sub-area. Here, the index may be a value of 0 to (k−1). In this case, the index of the sub-area corresponding to the partial area illustrated in FIG. 16 may be signaled, or the coordinate information of the sub-area corresponding to the partial area may be signaled. Conversely, the index of the sub-area corresponding to the N×M area, which is an area where the residual coefficient is encoded and transmitted by the encoding apparatus, may be signaled, or the coordinate information specifying the size/shape of the N×M area may be signaled.

Alternatively, information indicating either the x-coordinate or the y-coordinate of the coordinates (N, M) may be encoded and signaled. In this case, the partial area may be determined as one of a first group including the residual coefficient with a position of $(x_1, y_1)$ (where $N = < x_1 < W$, $0 = < y_1 < H$), a second group including the residual coefficient with a position of $(x_2, y_2)$ (where $0 = < x_2 < W$, $M = < y_2 < H$) or a third group including the residual coefficient with a position of $(x_3, y_3)$ (where $N = < x_3 < W$, $M = < y_3 < H$).

Alternatively, information indicating the coordinates (N, M) may be encoded and signaled. In this case, a group of residual coefficients, which is located at the right and bottom sides of the vertical/horizontal line passing through the coordinates (N, M), may be specified, and the specified group may be determined as the partial area.

In the above-described embodiment, the partial area may be determined based on at least one of the encoded information, and the residual coefficient of the partial area may be set to a pre-defined default value. For the N×M area of the residual block, the residual coefficient derivation method described in FIG. 5 and FIGS. 12 to 15 may be applied.

Meanwhile, the process of setting the residual coefficient to a default value may be selectively performed in consideration of at least one of the size or the shape of the residual block. For example, the above process may be applied only when the size of the residual block is greater than or equal to a predetermined threshold value. The size of the residual block may be expressed by at least one of the width or the height of the residual block. The threshold value may mean the minimum size at which it is allowed to set the residual coefficient to a default value (e.g., 0). The threshold value may be a value pre-defined in the encoding/decoding apparatus, or may be encoded and signaled by the encoding apparatus. The threshold value may be 32, 64, 128, 256, or more.

The process of setting the residual coefficient to a default value may be selectively performed based on flag information. The flag information may indicate whether to set the residual coefficient of the partial area (e.g., high frequency area) in the residual block to a default value. The flag information may be derived in the decoding apparatus based on the size/shape of the residual block, or may be encoded and signaled by the encoding apparatus. However, the above process may be limited to be performed only when the residual block is not encoded in the transform skip mode. Therefore, when the residual block is encoded in the transform skip mode, the encoding apparatus may not encode information necessary for setting the residual coefficient to a default value.

Although the exemplary methods of this disclosure are represented by a series of acts for clarity of explanation, they are not intended to limit the order in which the steps are performed, and if necessary, each step may be performed simultaneously or in a different order. In order to implement the method according to the present disclosure, the illustrative steps may additionally include other steps, include the remaining steps except for some steps, or may include additional steps other than some steps.

The various embodiments of the disclosure are not intended to be all-inclusive and are intended to illustrate representative aspects of the disclosure, and the features described in the various embodiments may be applied independently or in a combination of two or more.

In addition, various embodiments of the present disclosure may be implemented by hardware, firmware, software, or a combination thereof. In the case of hardware implementation, the hardware may be implemented by one or more application specific integrated circuits (ASICs), digital signal processors (DSPs), digital signal processing devices (DSPDs), programmable logic devices (PLDs), field programmable gate arrays (FPGAs), general processor, a controller, a micro-controller, a micro-processor, and the like.

The scope of the present disclosure includes a software or machine-executable instructions (e.g., operating system, applications, firmware, program, etc.) which makes operations according to the methods of the various embodiments be performed on the apparatus or computer and a non-transitory computer-readable medium, in which such software or instructions are stored, executable on the apparatus or computer.

INDUSTRIAL APPLICABILITY

The present disclosure may be used to encode/decode video signal.

The invention claimed is:

1. A method of decoding a video, comprising:
deriving a residual coefficient of a residual block from a bitstream;
calculating a quantization parameter for the residual block;
performing an inverse quantization on the residual coefficient using the calculated quantization parameter; and
reconstructing a residual sample of the residual block by performing an inverse-transform on the inverse-quantized residual coefficient,
wherein a quantization parameter for a chroma component block of the residual block is derived based on a quantization parameter prediction value for the chroma component block and a predetermined quantization parameter offset,
wherein the quantization parameter prediction value for the chroma component block is derived based on a quantization parameter for a luma component block of the residual block, and
wherein when the chroma component block has a division structure independent of the luma component block, the quantization parameter prediction value for the chroma component block is derived based on a quantization parameter for one of a plurality of luma component blocks corresponding to the chroma component block.

2. The method of claim 1, wherein a residual sample of a partial region in the residual block is set equal to a default value predefined at a decoding apparatus, and
wherein the partial region is representative of a region excluding at least one of N columns from a left side of the residual block or M rows from a top of the residual block.

3. The method of claim 2, wherein the N and the M are derived based on information which is encoded to specify a size or a position of the partial region.

4. The method of claim 1, wherein the residual block is representative of a block resulting from dividing based on at least one of a quad tree, a binary tree, or a triple tree.

5. The method of claim 1, wherein the quantization parameter for the one of the plurality of luma component blocks is representative of a quantization parameter of a luma component block corresponding to a position of a center sample.

6. A method of encoding a video, comprising:
performing a transform on a residual sample of a residual block to obtain a transform coefficient of the residual block;
performing a quantization on the transform coefficient of the residual block based on a quantization parameter to obtain a quantized transform coefficient of the residual block; and
generating a bitstream by encoding the quantized transform coefficient,
wherein a quantization parameter for a chroma component block of the residual block is derived based on a quantization parameter prediction value for the chroma component block and a predetermined quantization parameter offset,
wherein the quantization parameter prediction value for the chroma component block is derived based on a quantization parameter for a luma component block of the residual block, and
wherein when the chroma component block has a division structure independent of the luma component block, the quantization parameter prediction value for the chroma component block is derived based on a quantization parameter for one of a plurality of luma component blocks corresponding to the chroma component block.

7. A non-transitory computer-readable medium for storing data associated with a video signal, comprising:
a data stream stored in the non-transitory computer-readable medium, the data stream comprising a residual coefficient of a residual block,
wherein a quantization parameter for the residual block is calculated,
wherein an inverse-quantization is performed on the residual coefficient using the calculated quantization parameter,
wherein a residual sample of the residual block is reconstructed by performing an inverse-transform on the inverse-quantized residual coefficient,
wherein a quantization parameter for a chroma component block of the residual block is derived based on a quantization parameter prediction value for the chroma component block and a predetermined quantization parameter offset,
wherein the quantization parameter prediction value for the chroma component block is derived based on a quantization parameter for a luma component block of the residual block, and
wherein when the chroma component block has a division structure independent of the luma component block, the quantization parameter prediction value for the chroma component block is derived based on a quantization parameter for one of a plurality of luma component blocks corresponding to the chroma component block.

* * * * *